(12) United States Patent
Monk

(10) Patent No.: US 7,636,552 B2
(45) Date of Patent: *Dec. 22, 2009

(54) POINT-TO-MULTIPOINT COMMUNICATIONS SYSTEM AND METHOD

(75) Inventor: Anthony D Monk, Seattle, WA (US)

(73) Assignee: The Boeing Company, Chicago, IL (US)

( * ) Notice: Subject to any disclaimer, the term of this patent is extended or adjusted under 35 U.S.C. 154(b) by 493 days.

This patent is subject to a terminal disclaimer.

(21) Appl. No.: 11/314,641

(22) Filed: Dec. 21, 2005

(65) Prior Publication Data

US 2006/0229103 A1 Oct. 12, 2006

Related U.S. Application Data

(63) Continuation-in-part of application No. 11/184,712, filed on Jul. 19, 2005, now abandoned.

(51) Int. Cl.
*H04B 1/00* (2006.01)
*H04B 15/00* (2006.01)

(52) U.S. Cl. .............. 455/63.4; 455/431; 455/436; 455/437; 342/359; 342/372; 342/373

(58) Field of Classification Search .............. 455/562.1, 455/63.4, 69, 431, 432.1, 436, 437, 439, 455/440, 441, 442, 443, 452.2; 342/359, 342/357.08, 357.14, 372, 373, 377, 383

See application file for complete search history.

(56) References Cited

U.S. PATENT DOCUMENTS

| 4,259,674 A | * | 3/1981 | Dragone et al. | ............. 343/909 |
| 5,123,112 A | | 6/1992 | Choate | |
| 5,212,804 A | | 5/1993 | Choate | |
| 5,287,330 A | * | 2/1994 | Gilmour | ............. 367/103 |
| 5,444,762 A | | 8/1995 | Frey et al. | |
| 6,047,165 A | | 4/2000 | Wright et al. | |
| 6,148,179 A | | 11/2000 | Wright et al. | |
| 6,154,637 A | | 11/2000 | Wright et al. | |
| 6,160,998 A | | 12/2000 | Wright et al. | |
| 6,163,681 A | | 12/2000 | Wright et al. | |
| 6,167,238 A | | 12/2000 | Wright | |
| 6,167,239 A | | 12/2000 | Wright et al. | |
| 6,173,159 B1 | | 1/2001 | Wright et al. | |
| 6,253,064 B1 | | 6/2001 | Monroe | |
| 6,285,878 B1 | | 9/2001 | Lai | |
| 6,353,734 B1 | | 3/2002 | Wright et al. | |
| 6,392,692 B1 | | 5/2002 | Monroe | |
| 6,522,867 B1 | | 2/2003 | Wright et al. | |
| 6,529,706 B1 | | 3/2003 | Mitchell | |

(Continued)

FOREIGN PATENT DOCUMENTS

GB 2344211 5/2000

(Continued)

*Primary Examiner*—Tuan A Pham
(74) *Attorney, Agent, or Firm*—Harness, Dickey & Pierce, P.L.C.

(57) ABSTRACT

A point-to-multipoint communications system. The system uses an antenna to generate a single beam having independently steerable, narrow lobes. The phase array and amplitude array distributions used to form the lobes are controlled so that the lobes track and provide full duplex communication links with two or more RF terminals in two or more remote locations. In certain embodiments the dual lobe beam is generated from a fixed, ground-based location, and in other embodiments the single beam is generated from an airborne mobile platform, a mobile land vehicle, or a marine vessel. The various embodiments all enable one, two or more full duplex communication links to be established and maintained with a single beam.

20 Claims, 27 Drawing Sheets

U.S. PATENT DOCUMENTS

| | | |
|---|---|---|
| 6,580,915 B1 | 6/2003 | Kroll |
| 6,608,591 B2 * | 8/2003 | Wastberg .................... 342/373 |
| 6,642,894 B1 | 11/2003 | Gross et al. |
| 6,650,897 B2 | 11/2003 | Nelson |
| 6,680,924 B2 | 1/2004 | Hills et al. |
| 6,693,588 B1 | 2/2004 | Schlee |
| 6,725,035 B2 | 4/2004 | Jochim et al. |
| 6,745,010 B2 | 6/2004 | Wright et al. |
| 6,754,489 B1 | 6/2004 | Roux |
| 6,760,778 B1 | 7/2004 | Nelson et al. |
| 6,801,764 B2 | 10/2004 | Purpura |
| 6,801,769 B1 | 10/2004 | Royalty |
| 7,009,557 B2 * | 3/2006 | Kirchofer et al. .......... 342/359 |
| 2002/0019229 A1 | 2/2002 | Usher et al. |
| 2002/0075825 A1 | 6/2002 | Hills et al. |
| 2002/0082008 A1 | 6/2002 | Nelson |
| 2002/0160773 A1 | 10/2002 | Gresham et al. |
| 2002/0197990 A1 | 12/2002 | Jochim et al. |
| 2003/0003872 A1 | 1/2003 | Brinkley et al. |
| 2003/0008652 A1 | 1/2003 | Jochim et al. |
| 2003/0064704 A1 | 4/2003 | Purpura |
| 2003/0069015 A1 | 4/2003 | Brinkley et al. |
| 2003/0095067 A1 * | 5/2003 | Howell ....................... 342/377 |
| 2004/0102188 A1 | 5/2004 | Boyer et al. |
| 2004/0162067 A1 | 8/2004 | Stefani et al. |
| 2004/0180653 A1 | 9/2004 | Royalty |
| 2004/0192188 A1 | 9/2004 | Dieudonne |
| 2004/0198346 A1 | 10/2004 | Swensen et al. |
| 2004/0198347 A1 | 10/2004 | Roux et al. |

FOREIGN PATENT DOCUMENTS

| | | |
|---|---|---|
| WO | WO 00/76087 | 12/2000 |
| WO | WO 2005/022683 | 3/2005 |

* cited by examiner

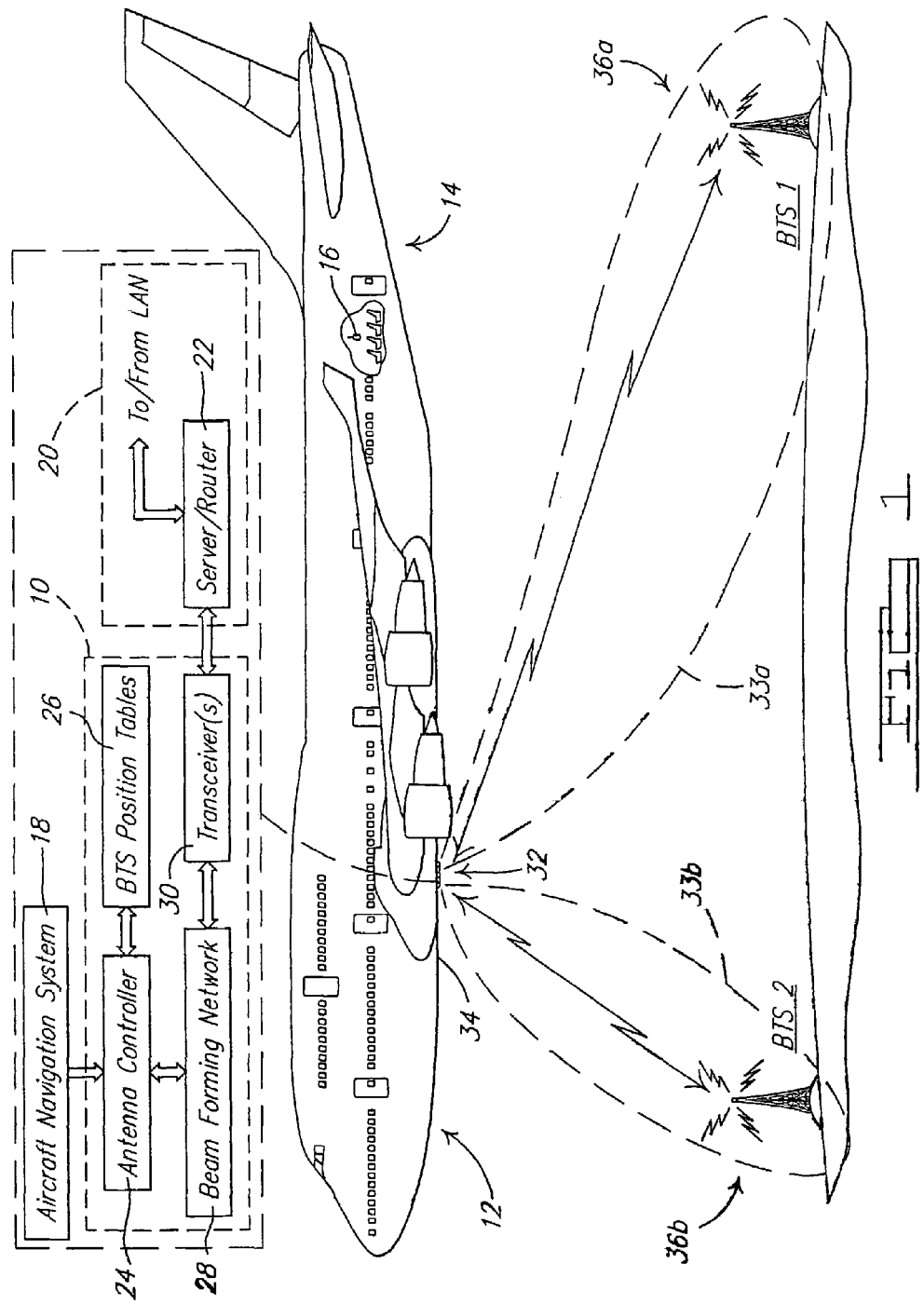

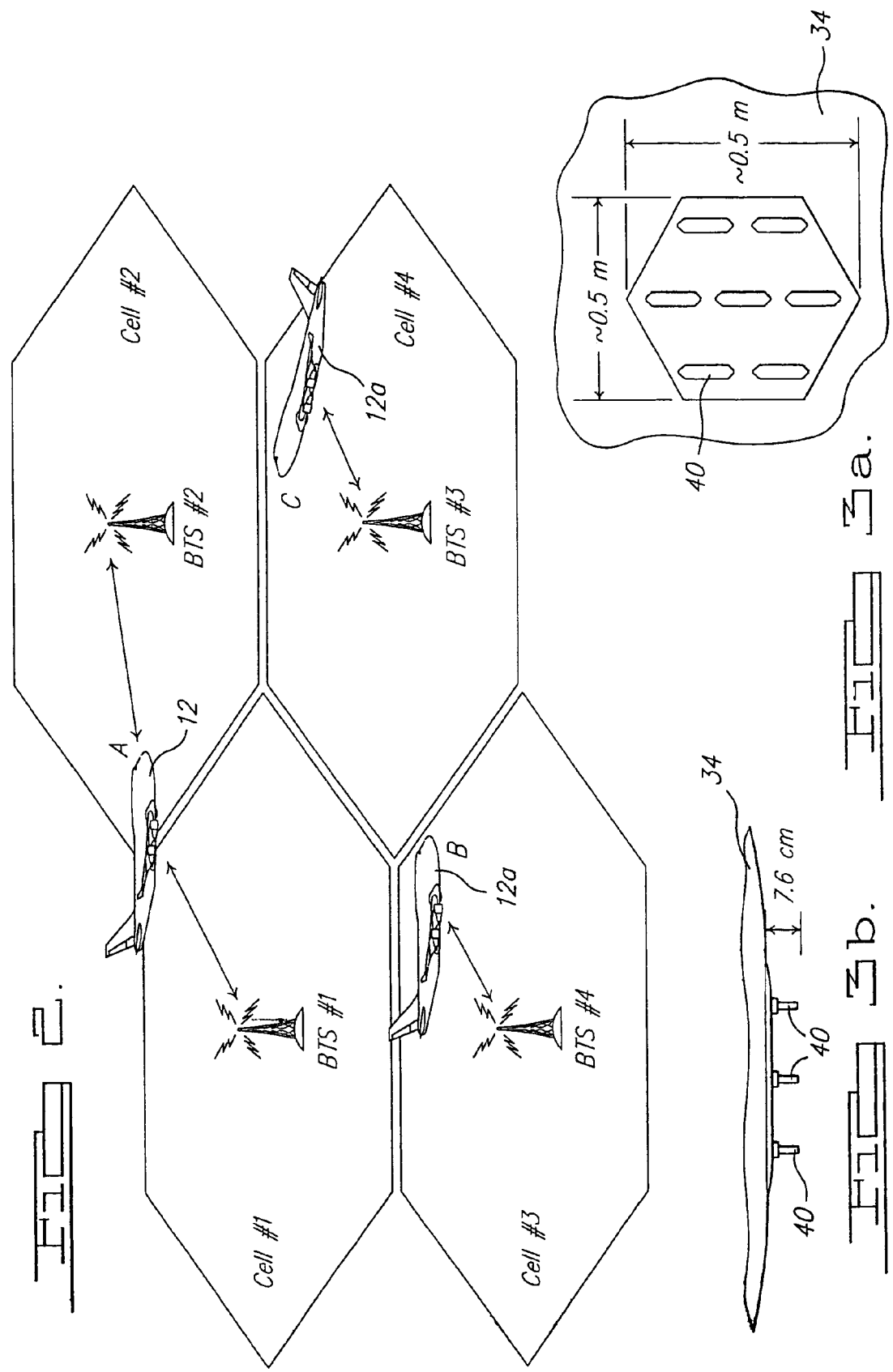

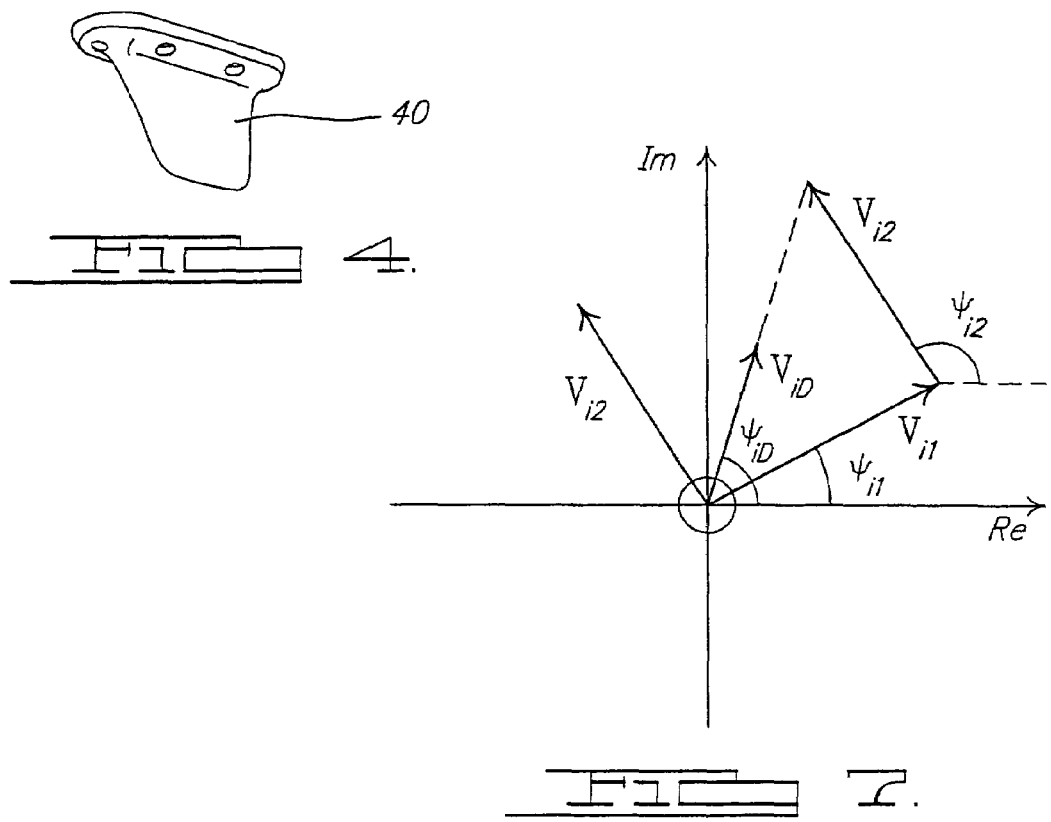
FIG. 4.
FIG. 7.
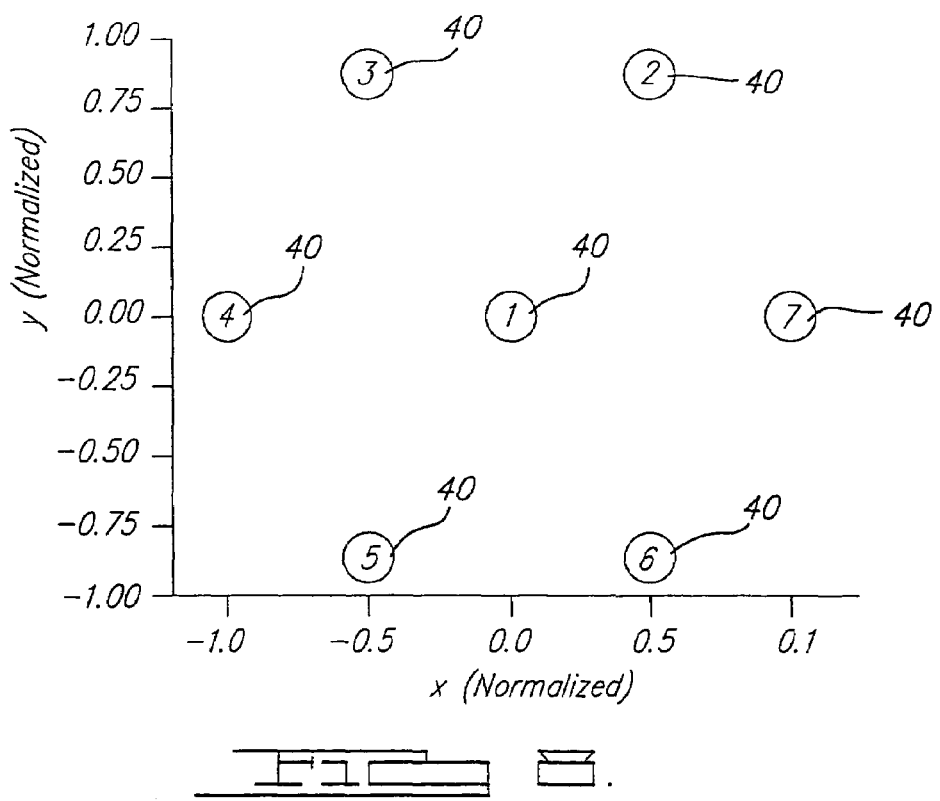
FIG. 5.

0° Separation

- Dark Blue — Lowest Gain
- Light Blue
- Green
- Yellow
- Red/Orange — Highest Gain 30° Separation

- Dark Blue — Lowest Gain
- Light Blue
- Green
- Yellow
- Red/Orange — Highest Gain 60° Separation

- Dark Blue — Lowest Gain
- Light Blue
- Green
- Yellow
- Red/Orange — Highest Gain

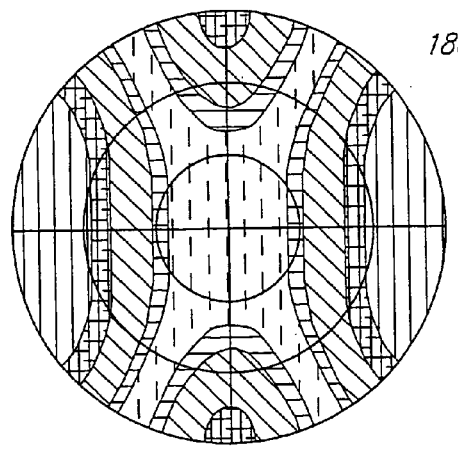
180° Separation
- Dark Blue — Lowest Gain
- Light Blue
- Green
- Yellow
- Red/Orange — Highest Gain
FIG. 9g.
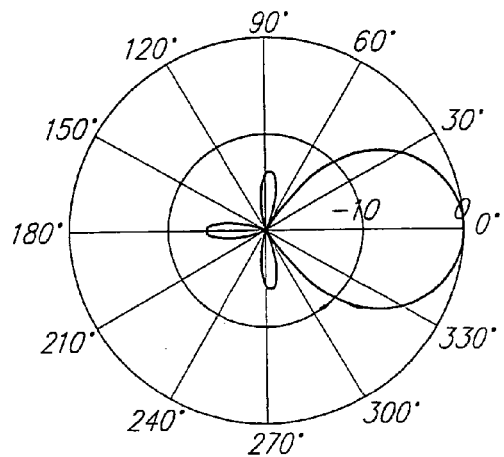
0° Separation
FIG. 10a.
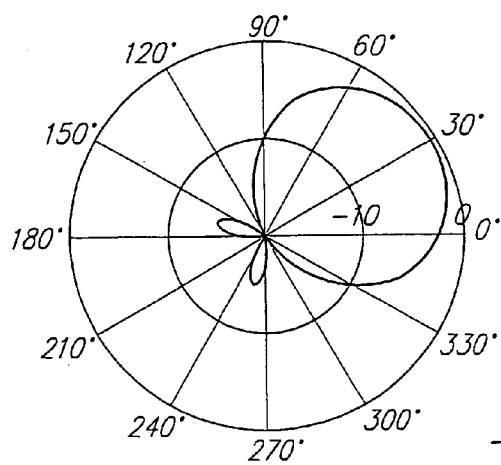
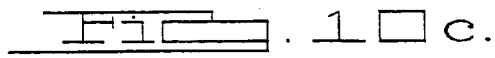
30° Separation
FIG. 10b.
60° Separation
FIG. 10c.

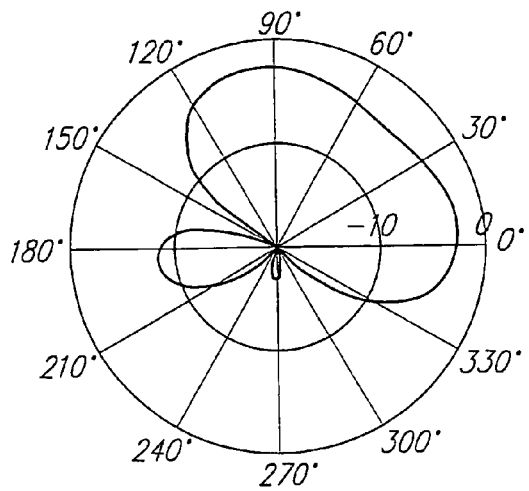
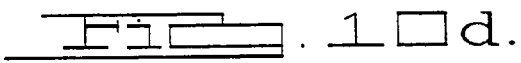
90° Separation
FIG. 10d.
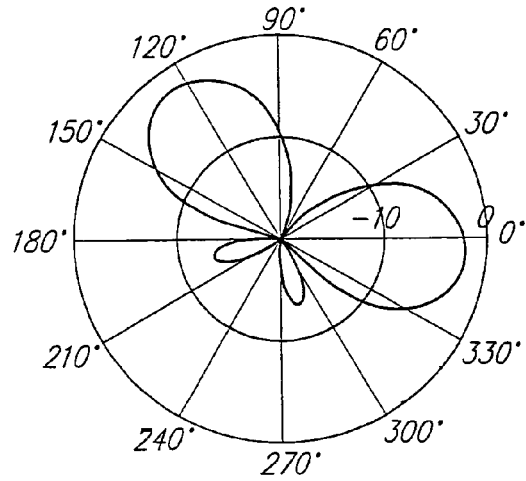
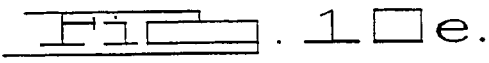
120° Separation
FIG. 10e.
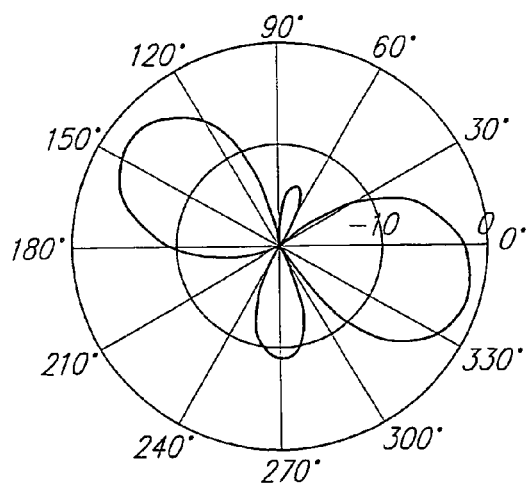
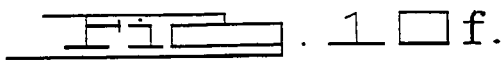
150° Separation
FIG. 10f.
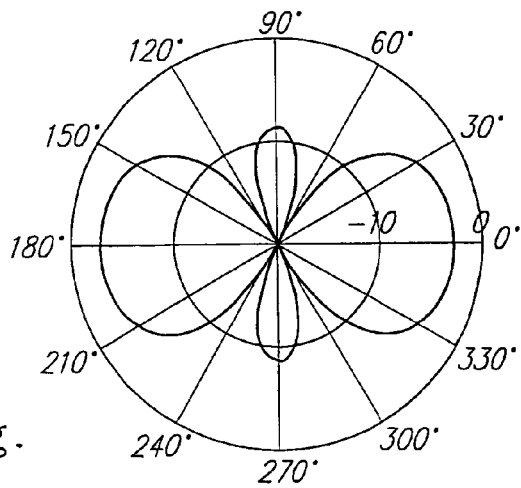
180° Separation
FIG. 10g.

α = 0

- Dark Blue — Lowest Gain
- Light Blue
- Green
- Yellow
- Red/Orange — Highest Gain

α = 0.1

- Dark Blue — Lowest Gain
- Light Blue
- Green
- Yellow
- Red/Orange — Highest Gain

α = 0.2

- Dark Blue — Lowest Gain
- Light Blue
- Green
- Yellow
- Red/Orange — Highest Gain $\alpha = 0.9$

- Dark Blue — Lowest Gain
- Light Blue
- Green
- Yellow
- Red/Orange — Highest Gain $\alpha = 1$

- Dark Blue — Lowest Gain
- Light Blue
- Green
- Yellow
- Red/Orange — Highest Gain $\alpha = 0$

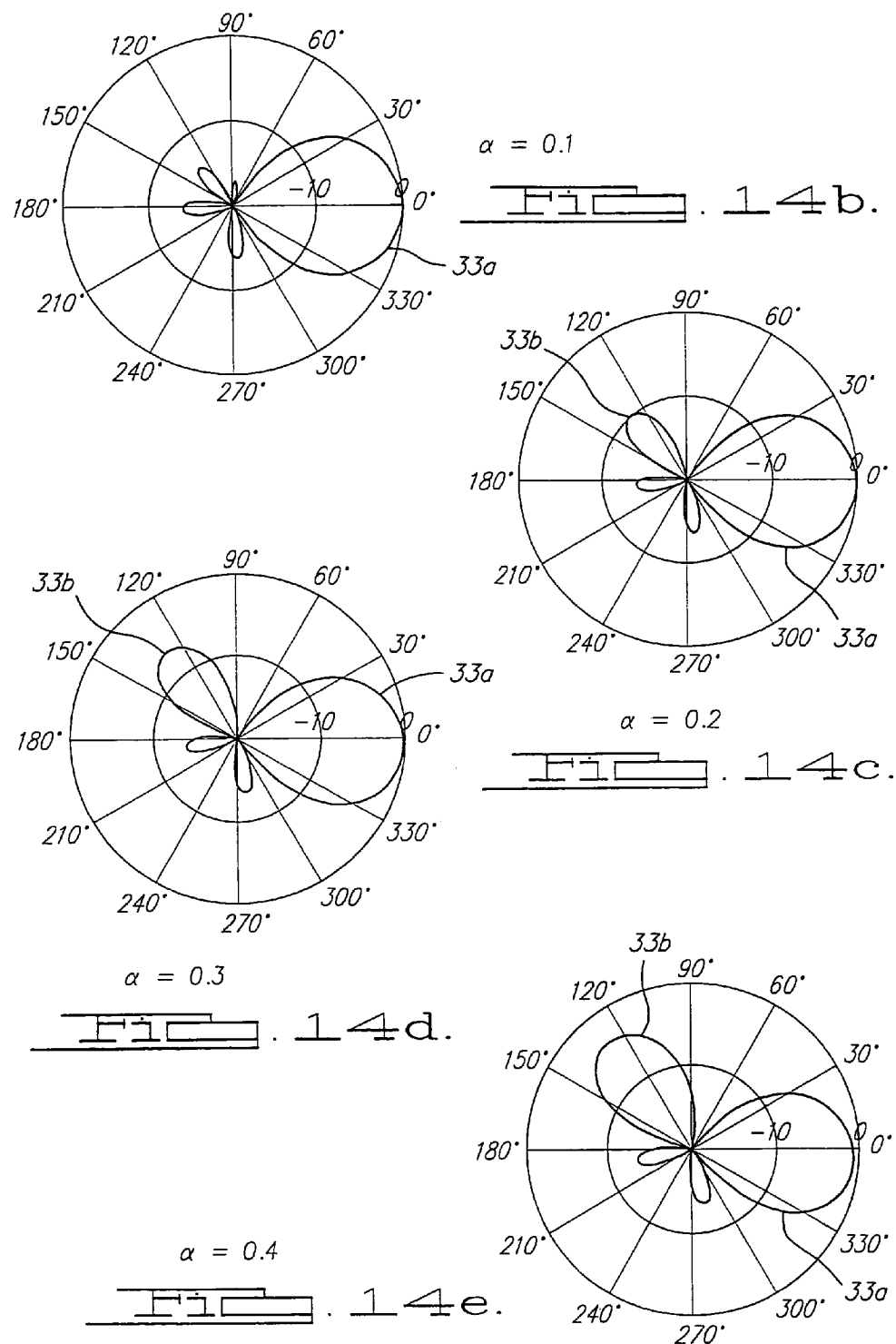

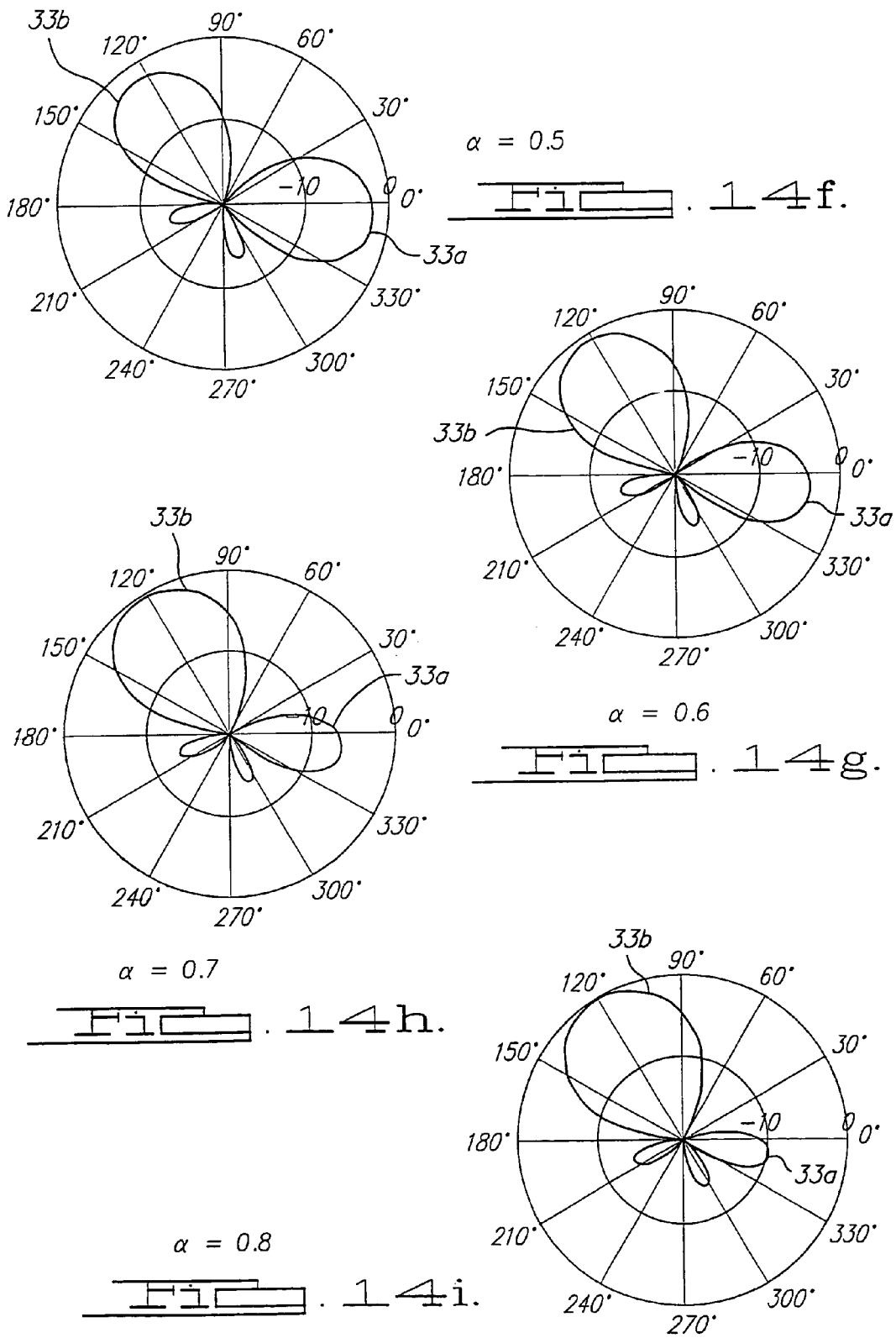

$\alpha = 0.9$ $\alpha = 1$

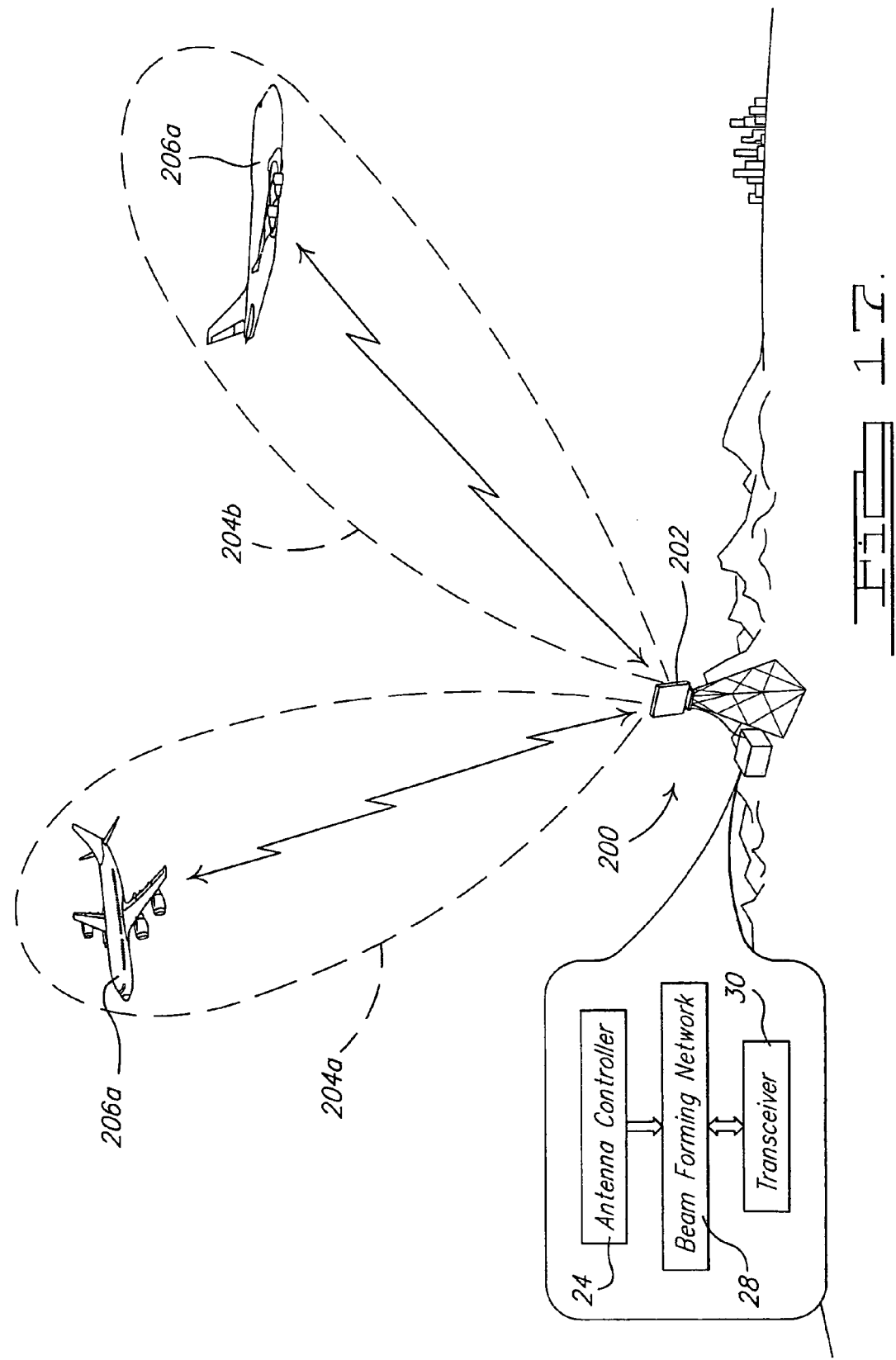

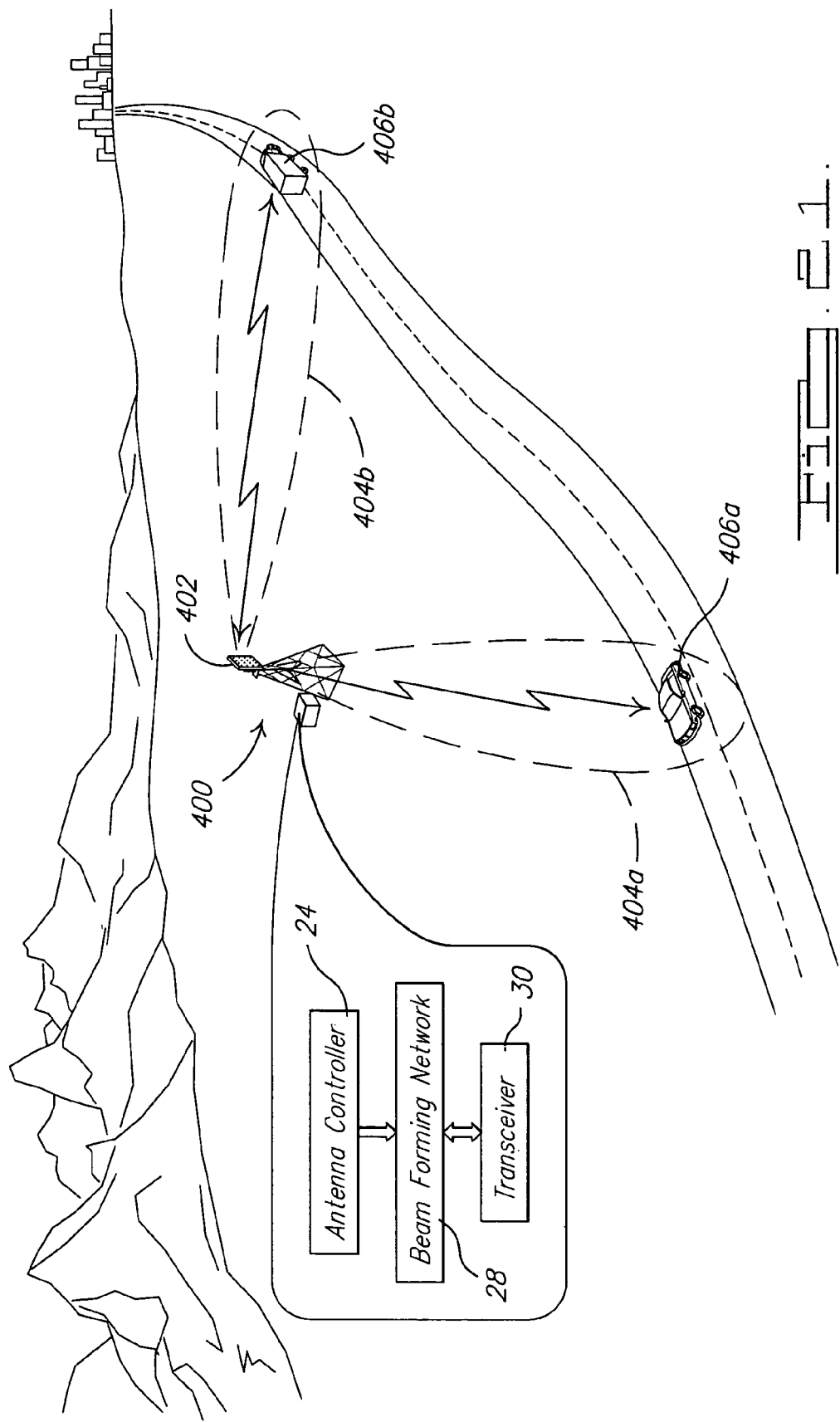

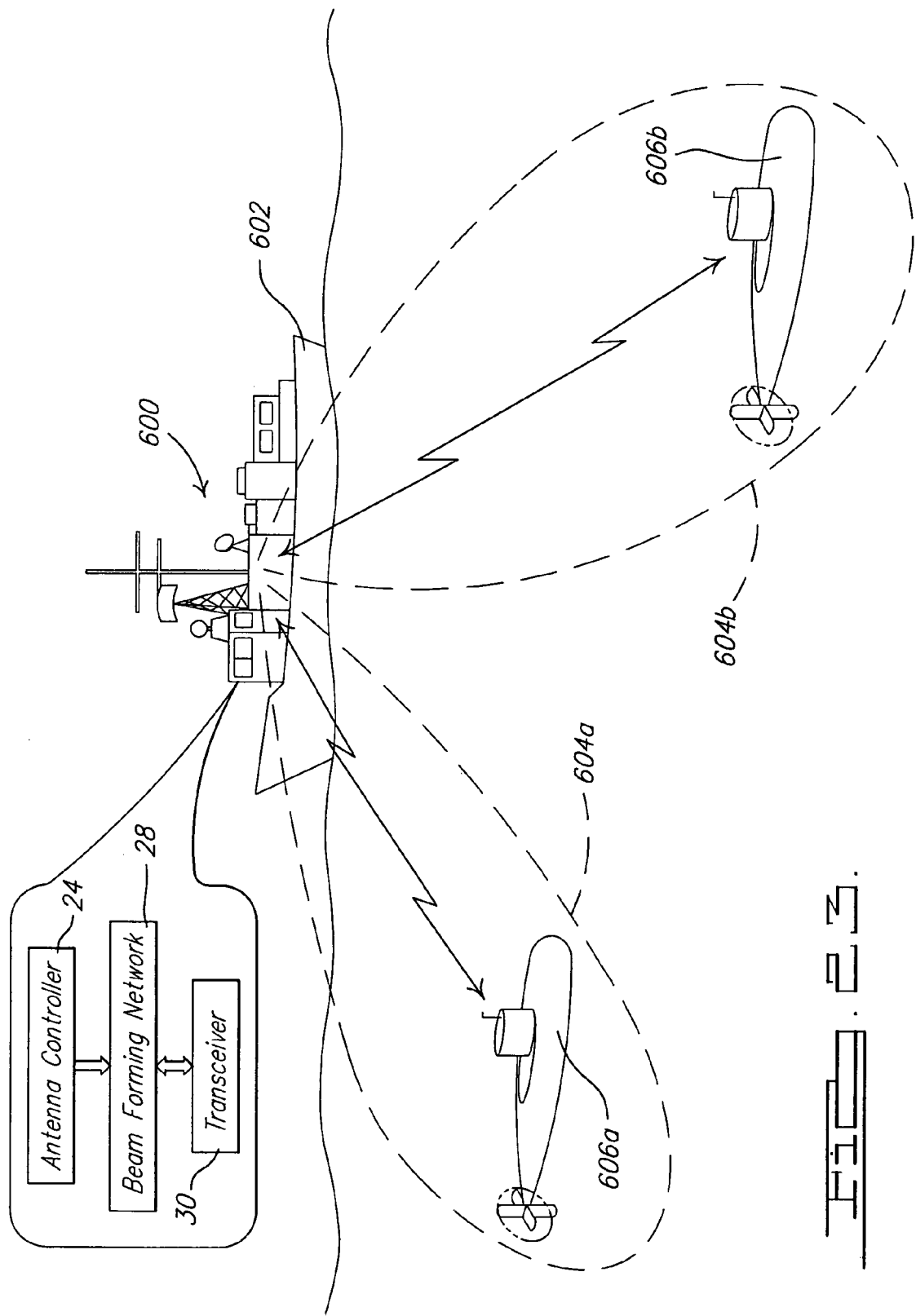

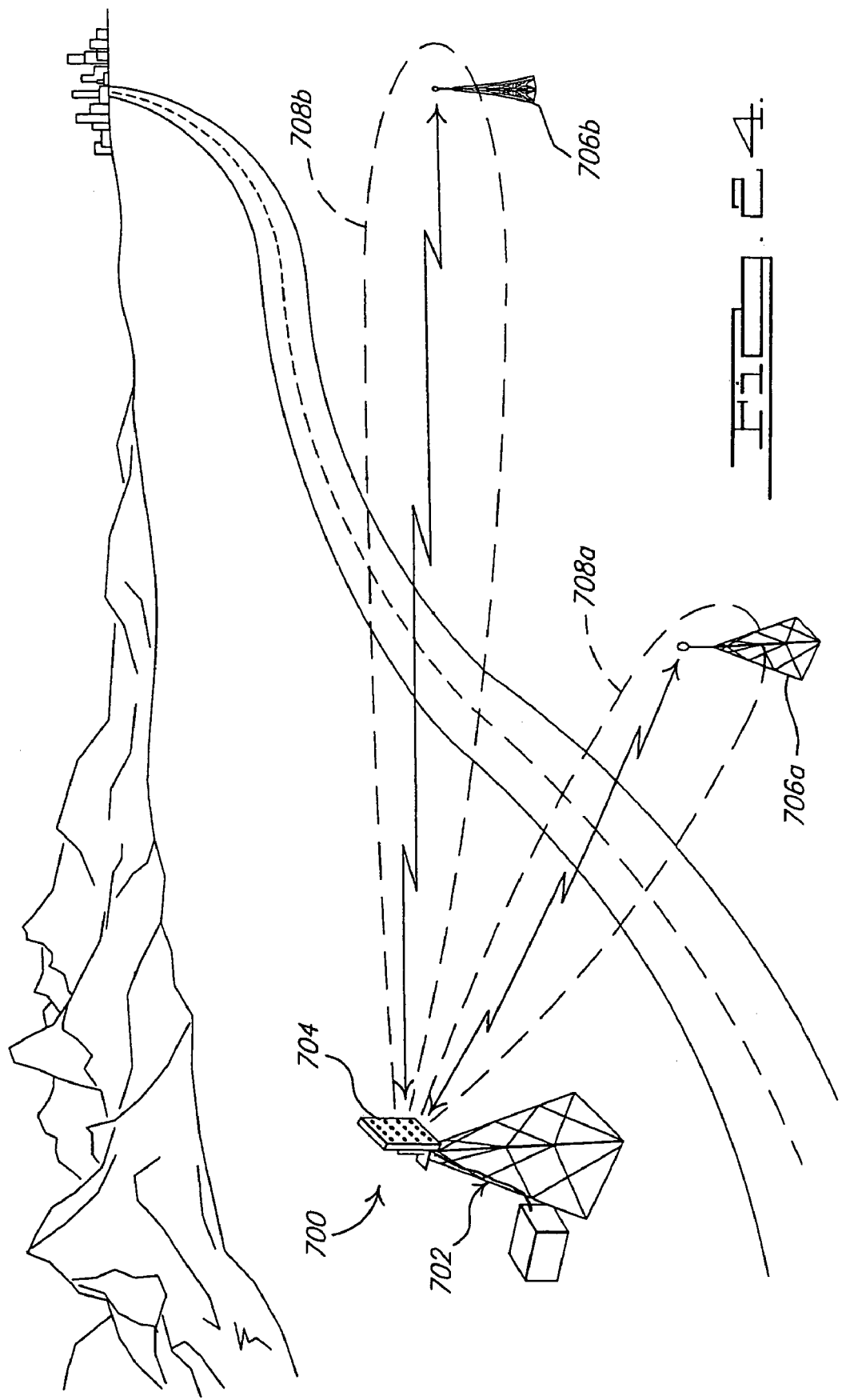

POINT-TO-MULTIPOINT COMMUNICATIONS SYSTEM AND METHOD

CROSS-REFERENCE TO RELATED APPLICATIONS

This present application is a continuation-in-part of U.S. Ser. No. 11/184,712, filed Jul. 19, 2005, which claims priority from U.S. Provisional Patent Application No. 60/669,950 filed on Apr. 8, 2005, both of which are hereby incorporated by reference into the present application. The present invention is also generally related to the subject matter of U.S. patent application Ser. No. 11/184,764, filed Jul. 19, 2005, and assigned to The Boeing Company, the disclosure of which is also incorporated herein by reference into the present application.

FIELD OF THE INVENTION

The present invention relates to communication systems, and more particularly to a point-to-multipoint communications system having a base station that is able to communicate simultaneously with a pair of remotely located terminals, via a plurality of independently steerable lobes of a single antenna beam generated from the base station.

BACKGROUND OF THE INVENTION

Point-to-multipoint communications systems have typically involved using a radio frequency (RF) central communications terminal (i.e., base station) that communicates simultaneously with two, three or more independent, remotely located terminals. This has traditionally been accomplished by the base station using an antenna aperture to generate a single beam having a lobe whose angular shape is sufficient to encompass the azimuthal range within which all of the remote terminals are located. This obviously has performance limitations. For example, a base station that generates a single lobe beam for communicating with a pair of remote terminals within an azimuth angular section of ±15 degrees would be required to "spread" the coverage pattern of a lobe over an azimuth sector of 30 degrees, which may result in a significant gain loss. However, it was known in advance that the two remote terminals were located at azimuth angles of, for example, −5.7 degrees and +9.6 degrees, and if two separate, narrow coverage lobes each having a azimuth coverage of about 3-4 degrees, centered around each of the azimuthal locations of the two remote terminals (i.e., around −5.7 degrees and +9.6 degrees), could be generated, then a significantly greater percentage of the overall gain available could be effectively utilized. Essentially, there would be less "wasted" gain because the two lobes would not be required to cover those areas between the two remote terminals, but only narrow azimuth ranges centered at each terminal. This more efficient use of the available gain would allow a given link performance (either in data rate or range) to be achieved but with a lower power transmit amplifier, as compared to the power amplifier that would be needed if the entire 30 degree coverage range had to be covered with a single lobe. Alternatively, a greater receive range or greater data rate could be achieved with a given receiver system, as compared to what could be achieved with a single coverage lobe. Thus, if the gain of the beam could be selectively directed via two or more independent coverage lobes at each of the remote terminals, performance of the system could be significantly improved.

SUMMARY OF THE INVENTION

The present invention is directed to an apparatus and method for implementing a wireless, point-to-multipoint communications system. The system and method of the present invention makes use of a single antenna aperture and a single beam forming network that generates a plurality of independently steerable, narrow (i.e., directional) lobes from a single antenna beam. Two, three or more lobes can be formed from the single beam depending on the needs of a particular application. The beam forming network can also generate a single beam having a single lobe if such is needed. Furthermore, a plurality of independent lobes can be generated, with one of the lobes being fixed on a specific target, while the other one or more lobes is/are steered independently at a different target(s). The lobes can further be focused at fixed, remote terminals, but they are also independently steerable. As such that they can be used to track moving communication terminals, such as terminals located on aircraft, ground vehicles, ships, etc.

Thus, the system and method enables simultaneous one way communication channels, or full duplex communication channels, to be formed with a plurality of independent, remotely located communications terminals, via a single beam. The independent steerability of the lobes of the single beam allow the communication channels to be maintained regardless if the remote terminals are moving in divergent directions. The system can be easily controlled to add or delete coverage lobes to accommodate changing numbers of remote terminals. Since the coverage lobes can be narrowly focused on each of the remote terminals, gain is not wasted to cover the full azimuthal region in between the two terminals, but is more efficiently used by the two narrowly focused lobes of the single beam.

An additional advantage of the independently steerable lobes of the single beam is that the signal gain associated with each lobe can be independently controlled. Thus, if one lobe has established a communications link with a remote terminal that is located in an area experiencing poor weather, the gain of the lobe can be controlled to compensate for this. Alternatively, the gain of each lobe can be controlled by the beam forming network to implement different data rates of communication with different remote terminals. Still further, the gain of each lobe can be tailored to best (and most efficiently) communicate with remote terminals located at different distances from the base station.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1 is a simplified diagram of a commercial aircraft implementing a communications terminal and method in accordance with a preferred embodiment of the present invention, and illustrating the aircraft in the process of making a soft handoff between two BTS sites;

FIG. 2 illustrates the shape of the borders of the cells formed by adjacent BTSs placed on a regular triangular grid of equal spacing;

FIG. 3a is a view of the undercarriage of a portion of the aircraft of FIG. 1 illustrating a plan view of the directional phased array antenna system mounted to the undercarriage, with the arrayed antenna removed;

FIG. 3b is a front view of the antenna system of FIG. 3a;

FIG. 4 is a perspective view of one of the seven antennas illustrated in FIG. 3a;

FIG. 6 is a flow chart illustrating the major steps of operation of the beam former subsystem;

FIG. 7 is a graphical representation of dual beam distribution produced from a single antenna element;

FIG. 8 is a graph of the phased array geometry of the seven element antenna of FIG. 3a;

FIGS. 9(a)-9(g) illustrate the gain patterns resulting from the beam synthesis method of the present invention at various azimuth angles along the horizon;

FIGS. 10(a)-10(g) are a plurality of polar plots depicting the antenna gain along the horizontal plane (azimuth cut in antenna terminology) for the gain patterns illustrated in FIGS. 9(a)-9(g), respectively;

FIGS. 14a-14k illustrate polar plots of the blended patterns in FIGS. 13a-13k, respectively, in the α=90° plane;

FIG. 16 is a flow chart illustrating the operations performed by the system in FIG. 15 in making a soft handoff from a first BTS site to a second BTS site;

FIG. 17 is a diagram of a point-to-multipoint communications system in accordance with a preferred embodiment of the present invention;

FIG. 21 is a diagram of an alternative preferred implementation of the present invention in which the multi-lobe beam is generated from a fixed, ground-based station;

FIG. 23 is a diagram of an alternative preferred implementation of the present invention in which the multi-lobe beam is deployed from a marine vessel; and FIG. 24 is a diagram of an alternative preferred implementation of the present invention in which the multi-lope beam is deployed from a fixed, terrestrial base station to communicate with a pair of remotely located, fixed terrestrial stations.

DETAILED DESCRIPTION OF THE PREFERRED EMBODIMENTS

Figure 5:
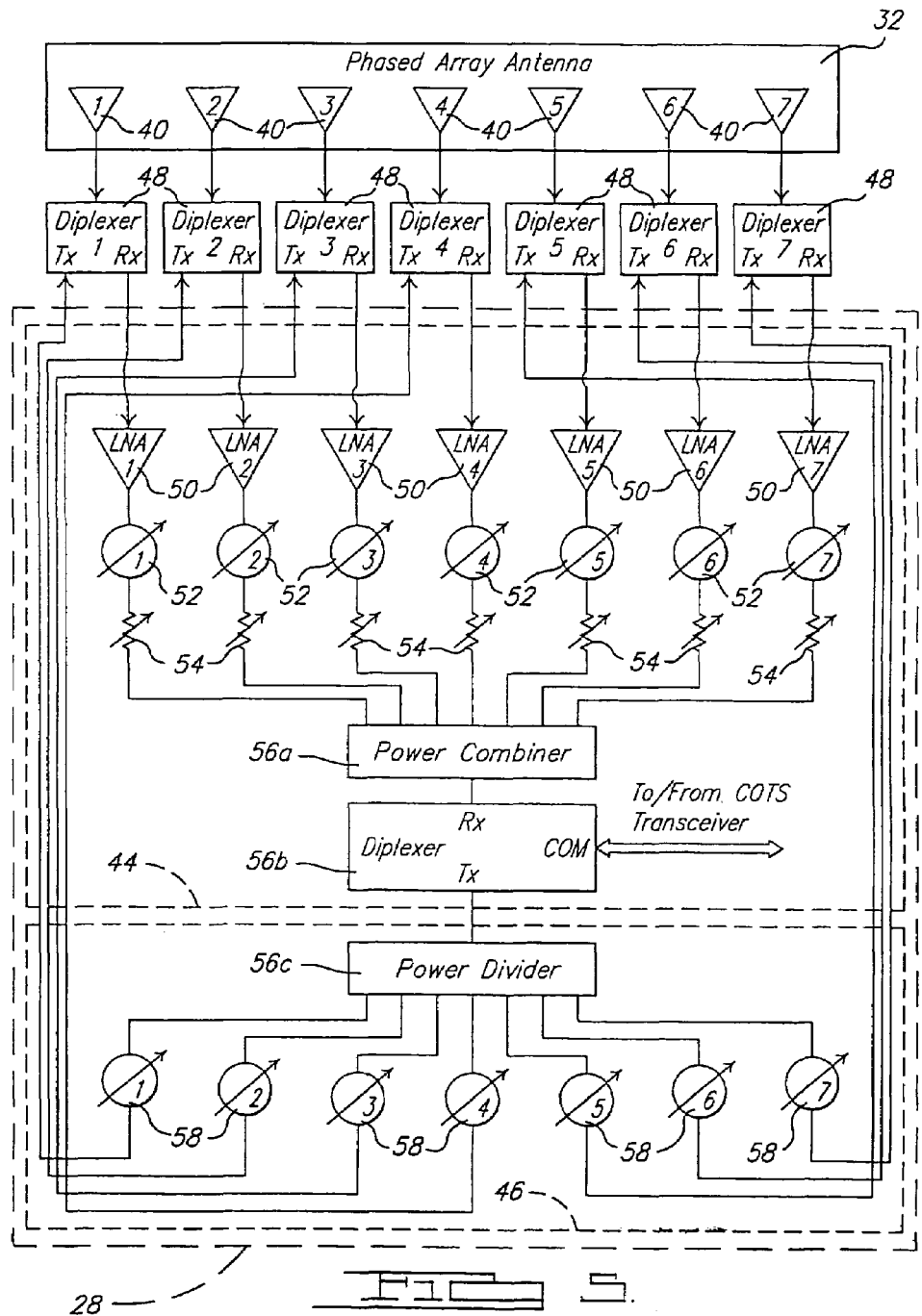
FIG. 5 is a simplified schematic representation of the beam former subsystem.
Figure 5:
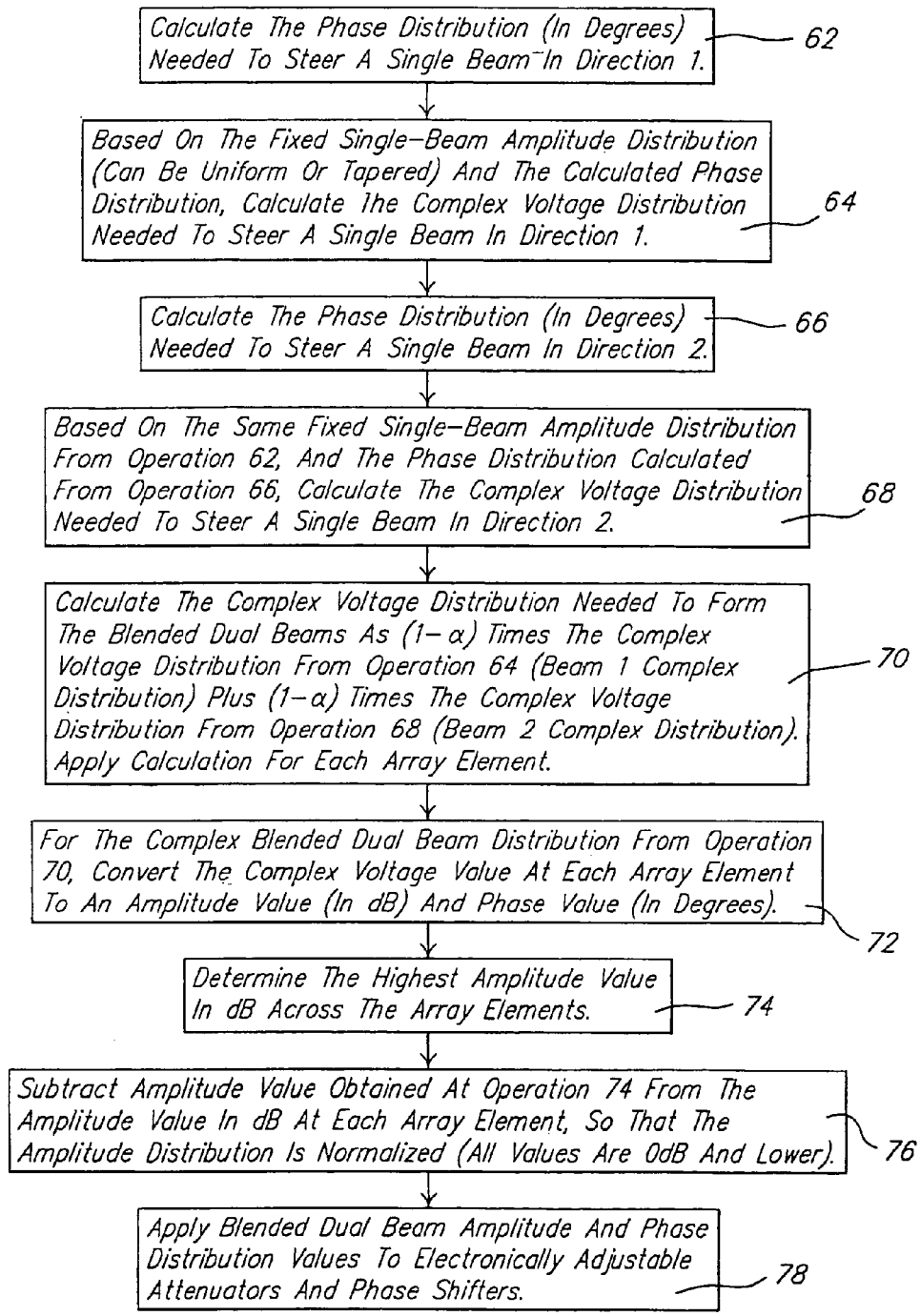
Figure 9A:
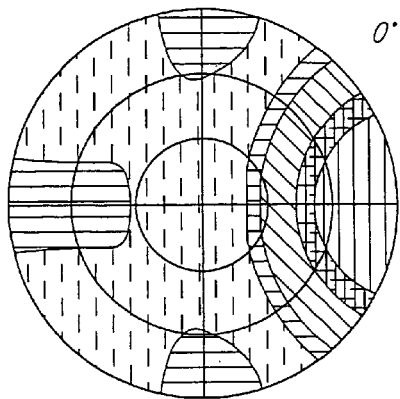
Figure 9B:
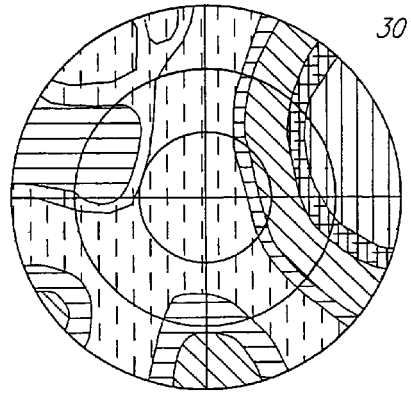
Figure 9C:
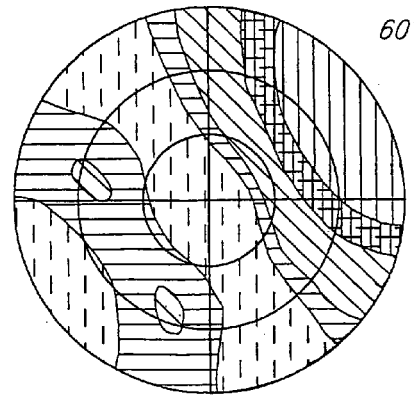
Figure 9D:
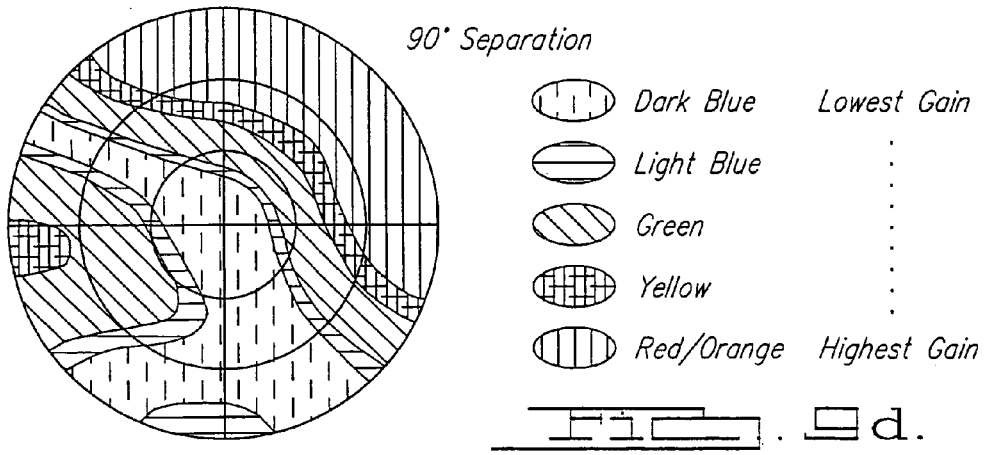
Figure 9E:
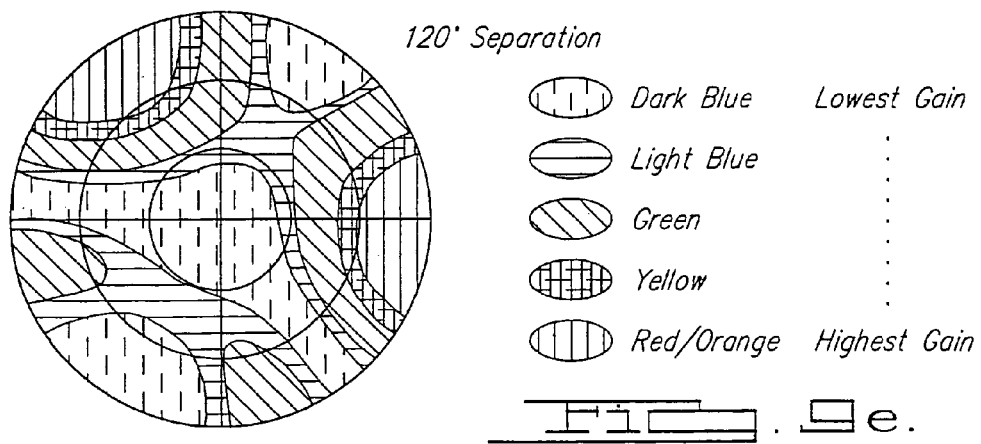
Figure 9F:
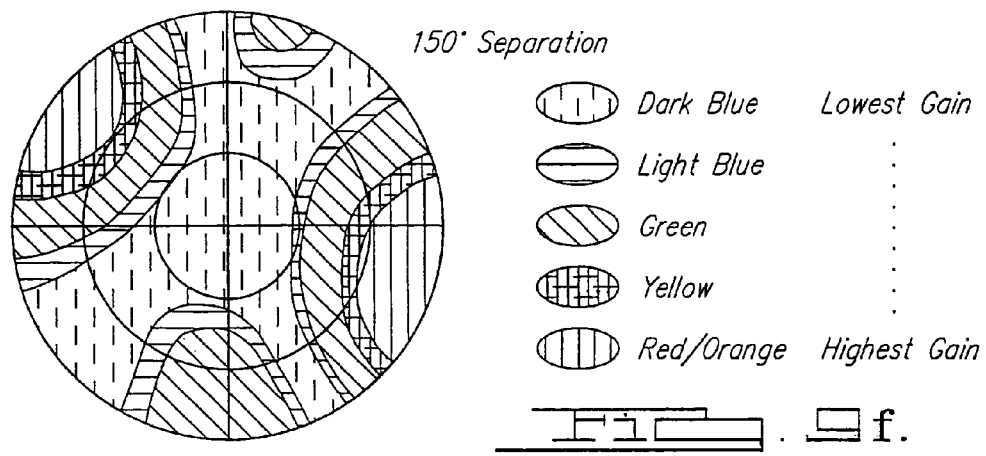

The following description of the preferred embodiment(s) is merely exemplary in nature and is in no way intended to limit the invention, its application, or uses.

Referring to FIG. 1, there is shown an aircraft radio terminal (ART) 10 in accordance with a preferred embodiment of the present invention. The ART 10 is implemented, in this example, on a commercial aircraft 12 having a fuselage 14. One or more occupants on the aircraft 12 have in his/her possession a cellular telephone 16, which alternatively could form a wireless personal digital assistant (PDA). The aircraft 12 includes an aircraft navigation subsystem 18 and an on-board network 20 that incorporates a server/outer 22 in communication with a local area network (LAN) implemented on the aircraft 12. Although not shown, it will be appreciated that the LAN implemented on the aircraft 12, in one preferred form, makes use of a plurality of wireless access points spaced throughout the interior cabin area of the aircraft 12. The wireless access points enable communication with the cellular phone 16 throughout the entire cabin area of the aircraft 12. One suitable wireless LAN system which may be implemented is disclosed in U.S. patent application Ser. No. 09/878,674, filed Jun. 11, 2002, and assigned to the Boeing Company, which is incorporated by reference into the present application.

The ART 10 of the present invention, in one preferred embodiment, comprises an antenna controller 24 that is in communication with a base transceiver station (BTS) position look-up table 26. The antenna controller 24 is also in communication with a beam forming network 28. The beam forming network 28 is in bidirectional communication with at least one RF transceiver 30, which in turn is in bidirectional communication with the server/router 22. While the ART 10 of the present invention will be described, in one embodiment, as being used to facilitate cellular communications, which typically fall within the UHF/L band frequency spectrum, it will be appreciated that the ART 10 can just as readily be utilized to communicate electromagnetic wave signals in other frequency spectrums.

The antenna controller 24 operates to calculate the phase and amplitude settings within the beam forming network 28 to steer the beam from a phased array antenna system 32 mounted on an undercarriage 34 of the fuselage 14. Phased array antenna system 32 is illustrated being covered by a suitably shaped radome. A significant feature of the present invention is that the beam forming network 28 controls the phased array antenna system 32 to create two simultaneous and independently steerable lobes from a single antenna beam of the antenna system 32. Alternatively, the beam forming network 28 can control the antenna system 32 to create a single beam having only a single lobe, which is the mode of operation that would be used for the vast majority of operating time of the aircraft 12. Generating a beam with only a single lobe aimed at one BTS station spatially isolates the transmit signal from the antenna system 32. This reduces network interference to adjacently located, but non-target, BTS sites, and thus increases the communication capacity of the overall network.

With further reference to FIG. 1, the BTS look-up position table 26 includes stored data relating to the locations (latitude and longitude) of all of the BTS sites in the cellular network. The aircraft navigation subsystem 18 provides information on the position of the aircraft 12 (latitude, longitude and altitude), as well as attitude information (i.e., pitch, roll and heading). Alternatively, the ART 10 may comprise its own geolocation and attitude sensors. In either implementation, the locations of the network BTSs, as well as the location and attitude of the aircraft 12, are provided to the antenna controller 24. From this information, the antenna controller 24 calculates the antenna pointing angles needed to accurately point the lobe (or lobes) of the beam from antenna system 32 at the target BTS (or BTSs) within the cellular network.

New Communication with One BTS Site

In its simplest phase of operation, the aircraft 12 communicates with a single BTS site. For example, assume that the aircraft 12 is communicating with BTS site 36(*a*) (BTS #1) in FIG. 1. The beam forming network 28 generates a beam having a single lobe that is directed towards BTS1 36(*a*). The closest BTS site will generally provide the maximum received signal strength in a network where all BTSs transmit at the same power, using identical antennas having a nearly omnidirectional pattern in azimuth, in a predominantly line-of-sight condition (which is typically the case for ATG networks). Thus, in one preferred form the ART 10 determines antenna pointing directions completely independently of the operation of the radio transceivers 30. This is a significant feature because it permits the use of commercial off-the-shelf (COTS) transceiver modules and transmission standards that are designed to operate with standard cellular handsets having omnidirectional antennas. The ART 10 maintains the link width BTS1 36(*a*) until its aircraft navigation system 18, in connection with the BTS look-up position table 26, determines that the aircraft 12 is approaching a different BTS and will need to make a handoff from the presently used BTS1 site 36(*a*) to a new BTS site. Ideally, the handoff should be "seamless," meaning that there is no obvious degradation in quality of service to users using their cellular devices onboard the aircraft 12 as the handoffs are performed. Soft handoffs are preferred because they are generally viewed as the most reliable, meaning that they provide the lowest probability of a dropped connection, as well as the best quality handoff (i.e., a handoff that produces no apparent degradation of service). Present day $3^{rd}$ generation cellular networks almost always use soft handoffs (but are capable of hard handoffs in unusual circumstances, such as when making channel changes).

Description of Coverage Cells

With brief reference to FIG. 2, each BTS station 36 provides service coverage to an area of the earth, and the earth-space above it, called a "cell." When BTSs are placed on a regular triangular grid of equal spacing, then the cells that have boarders at the midpoints between the BTSs appear as hexagons, as shown in FIG. 2. Each hexagon thus represents an area of coverage (i.e., cell) provided by a particular BTS site. A regular triangular grid of BTSs has been illustrated merely as one example of how the BTS sites could be arranged. Practical considerations in the siting of BTSs (e.g., terrain, utilities, access, etc.) and uneven distribution of cellular traffic density usually cause cellular networks to have irregular BTS spacing and non-hexagonal shaped cells. For an ATG cellular network, the maximum cell size is typically set to ensure line-of-sight visibility at some minimum altitude. For example, if a requirement is to serve aircraft flying above 10,000 ft. (3033 m) altitude, then the maximum cell radius should not exceed about 150 miles (241.5 km), which is the radial horizon distance at 10,000 feet to a 50 ft. (15.16 m) tall tower at UHF.

Soft Handoff

The ART 10 performs a soft handoff as the aircraft 12 is leaving a coverage area of one BTS and entering the coverage area of a different BTS. In FIG. 2, aircraft 12 is illustrated as performing a soft handoff from BTS #1 to BTS #2. During the short period of time, typically less than one minute, when the soft handoff is occurring, the aircraft 12 is communicating with both base stations (BTS #1 and BTS #2) simultaneously. When an aircraft, for example aircraft 12*a* in FIG. 2, is not crossing the boundary between two cells, the aircraft only communicates with a single BTS. An aircraft flying through the center of cells at approximately 600 mph (996 km per hour) would only be in a soft handoff procedure for less than about 3.3% of its operating time, assuming soft handoffs that last about one minute in duration and cells of 150 mile (241.5 km) radius.

With reference to FIGS. 1 and 2, the ART 10 provides the advantage of requiring no coordination or communication between the antenna controller 24 and the radio transceiver 30 to recognize the need for a handoff, or to coordinate a handoff. Thus, the present invention, the antenna controller 24 does not know the exact moment that the ART 10 begins and ends a soft handoff. However, when the antenna controller 24, operating in connection with the BTS look-up position table 26, determines that a soft handoff procedure needs to be implemented, the antenna controller 24 initially causes a dual lobed beam to be generated from the antenna system 32. The dual lobed beam has one of its lobes 32*a* (FIG. 1) directed at the BTS that is presently being used, and the other lobe 33*b*, pointed at a nearly equidistant BTS, which is to receive the soft handoff. The radio transceiver 30 reacts by adding the second BTS 36(*b*) to its "active" list. Then the antenna controller 24 "fades out" the lobe 33*a* pointing to the initial BTS1 36*a*, leaving only one lobe (lobe 33*b*) pointing at the new BTS2 (BTS 36*b*). The radio transceiver 30 reacts to the artificial fade by handing off to the new BTS 36*b* having a stronger (i.e., better) quality signal. The rate at which the fade occurs may be controlled by the antenna controller 24, however, as explained earlier, the fade preferably occurs over a period of about one minute or less. An instantaneous fade, or transition from a dual lobed beam to a single lobe beam, may reduce the reliability of the handoff, but still could be performed if a particular situation demanded an immediate handoff. In terrestrial cellular networks, fading due to multipath or shadowing can occur very quickly (less than one second), but it is not instantaneous. So the ability to "soft fade" allows the ART 10 to better mimic what occurs on the ground with conventional omnidirectional antennas. Since the antenna controller 24 performs the creation (i.e., fading in) of a dual lobed beam, as well as the fading out to a single lobe beam, the hand off from one BTS to another BTS appears as a seamless transition to the cellular user on the aircraft 12. An additional advantage is that no input or control is required from crew members onboard the aircraft 12 to monitor and/or manage the soft handoffs that need to be implemented periodically along the route that the aircraft 12 travels.

Criteria for Hand-Off Decision Making

There are at least several different decision making criteria that may be employed in determining exactly when a hand off from one BTS station to another BTS station may be initiated. One is by using a suitable "nearest BTS" algorithm. Such an algorithm simply chooses to use the BTS which is closest to the aircraft at any given time. For this a database on board the aircraft is needed that contains the location data (latitude, longitude and possibly altitude) for all the BTSs. In this example the BTSs are all ground-based, so altitude data would not be consideration. At regular intervals, which could typically be every 30 seconds or so, the aircraft makes a simple calculation, based on the data in the database and the location of the aircraft (taken from the aircraft's navigational system), to determine which of the BTSs in its vicinity are closest to the aircraft. This data is used to estimate when a new BTS (i.e., one other than the "active" BTS) will come within a distance of the aircraft (considering the heading of the aircraft) that is approximately the same distance from the aircraft as the active BTS (and thereafter will become closer as the aircraft continues on its path of travel). A handoff from the first BTS to the second will be made at this time, so that the aircraft is always operating with the closest BTS.

A suitable "closest BTS" algorithm will now be described below. The locations of all the BTSs (latitude, longitude and height asl) are available from the BTS database, which will be loaded on the aircraft. The location of the aircraft (latitude, longitude and height above seal level ("asl")) as a function of time is available from the aircraft's navigational system. From this locational data, the line-of-sight distance of the aircraft from each of the base stations is calculated as:

$$s = \text{Sqrt}((xa-xbts)^2 + (ya-ybts)^2 + (za-zbts)^2)$$

where (xa,ya,za) and (xbts,ybts,zbts) are the Cartesian coordinates (in an earth-fixed coordinate system) of the aircraft and base station respectively. These are computed from the latitude, longitude and altitude data:

$$x = (re+h) * \text{Cos}(lat) * \text{Cos}(long)$$

$$y = (re+h) * \text{Cos}(lat) * \text{Sin}(long)$$

$$z = (re+h) * \text{Sin}(lat)$$

where "re" is the earth's radius, "h" is the height asl, and "lat" and "long" are latitude and longitude respectively.

The aircraft/BTS distance does not necessarily need to be calculated for all the BTSs in the database, but only for those that are visible and above the radio horizon. Thus, performing a geometric pre-filtering calculation to first identify only those BTSs that are above the radio horizon would be made first. Alternatively, an even simpler approach would be to just eliminate all BTSs that are more than, for example, five-hundred miles from the aircraft.

A second method for determining when to initiate a hand off involves using a "best Signal/Interference (S/I) ratio" algorithm as part of periodic, real time calculation. For example, if the BTSs were uniformly distributed, the "nearest BTS" algorithm would work near-optimally. In practice there is typically clustering of BTSs in metropolitan areas, and in particular close to airports. If there are 2 BTSs close to each other, then during a receive operation, if the antenna system 32 steers its primary lobe to work with one of these BTSs, there may be strong interference coupled into the antenna system 32 from the other BTS, as both BTSs, may be within the relatively wide single lobe beam. In such situations, a higher S/I ratio and hence better system performance would be obtained by selecting and using another BTS which is actually not the next closest BTS to the aircraft. Preliminary testing has indicated that for realistic BTS locations (including some BTS clustering), using the "best S/I" approach increased the worst case S/I by around 5 dB.

The real time version of this algorithm performs the same calculations as was performed during the above-mentioned testing in simulations, but in real time. The same BTS location database would be needed to support this, as would aircraft positional data from the aircraft's navigational system. At each time point along the flight path, for example, on the order of every 30 seconds, the system would first identify which base BTSs are above the radio horizon and hence "visible" to the aircraft. The system would then calculate the S/I ratio with the main lobe pointed at each of these in turn, with the "S" being the power received via the main lobe from the selected BTS, and the "I" being the aggregate interference power received via the sidelobes or side of the main lobe from all the other BTSs. Having carried out this calculation for each of the visible BTSs, the one with the highest S/I would be selected as the best to operate with. The time for handoff would be estimated as that time at which the S/I ratios for the best and second best BTSs become equal, with the second best about to out perform the previous best and deliver a higher S/I.

A third method for deciding exactly when to make a hand off involves a using the "best S/I Ratio" method described above, but in pre-calculated look-up tables, rather than as part of real time calculations. The result here is the same as the second method described above, i.e., that the metric used to select the best BTS is the S/I ratio. The difference is that rather than compute S/I estimates in real time, the calculations would be made off-line with the results stored in look-up tables. These tables would define "patches" on the ground whose boundaries are defined in latitude and longitude, with each patch defining the geographical area within which a particular BTS provides the best S/I. When the aircraft is about to cross from one patch to the next, it would prepare to initiate a handoff, with the handoff ideally occurring on the patch boundary. In practice, the above is a simplification because it is a 3-D rather than 2-D problem, with aircraft altitude representing the 3rd dimension, and the patches turning into volume elements. Significant computer resources would typically be needed to compute these look-up tables, but the creation of such look-up tables still are a possibility.

Phased Array Antenna Subsystem

Referring now to FIGS. 3a, 3b and 4, the antenna system 32 can be seen in greater detail. The antenna system 32 incorporates, in one preferred implementation, seven independent monopole blade antenna elements 40 (FIG. 3a) mounted directly to the fuselage 14 of the aircraft 12 on its undercarriage 34. The antenna elements 40, in this example, are arranged in a hexagonal pattern. The antenna system 32, however, can be implemented with any size of phased array antenna having any number of antenna elements arrayed in virtually any geometric form. However, given practical size constraints, and considering operation at UHF frequencies around 850 MHz, a phased array antenna having seven elements is an acceptable choice. With a seven element phased array antenna, one near-optimal array geometry is that of six elements at the vertices of a hexagon and the seventh at the center, as illustrated in FIG. 3a. The antenna elements 40 can be of a variety of types, but in one preferred implementation each comprises a quarter wavelength monopole element having an omnidirectional gain pattern in the azimuth plane. The seven monopole antenna elements 40 are mounted in a direction generally perpendicular to the undercarriage 34 of the aircraft. This provides vertical polarization when the aircraft 12 is in a level attitude, as shown in FIG. 1. The antenna elements 40 are available as commercial off-the-shelf products from various aeronautical antenna suppliers. For example, one suitable antenna is available from Comant Industries of Fullerton, Calif. under Part No. CI 105-30. The antenna elements 40 are spaced approximately a half wavelength apart in a triangular grid to create the phased array antenna shown in FIG. 3a. Alternatively, antenna elements providing horizontal polarization (such as loop antenna elements), could also be employed although the vertically polarized monopole elements provide the more straight forward implementation.

Beam Forming Subsystem

The beam forming network 28 of the present invention applies the phase and amplitude shift to the transmit and receive signals to form a beam having one or two lobes (lobes 33a and 33b), as illustrated in FIG. 1. The beam forming network (BFN) 28 also controls the beam of the antenna system 32 to provide transitional states to accomplish gradual fading between single and dual lobe states.

Referring to FIG. 5, a preferred implementation for the beam former network 28 is shown in greater detail. The beam former network 28 comprises a full duplex transmit/receive subsystem having an independent receive beamformer subsystem 44 and transmit beam former subsystem 46. However, the beam former network 28 may comprise a transmit only system, or receive only system, if the application only requires one-way communications. The receive beamformer subsystem 44 includes a plurality of diplexers 48, one for each antenna element 40. The diplexers 48 act as bi-directional interfacing elements to allow each antenna element to be interfaced to the components of both the receive beamformer subsystem 44 and the transmit subsystem beamformer 46.

The receive beamformer subsystem 44 includes a plurality of distinct channels, one for each antenna element 40, that each include a low noise amplifier (LNA) 50, a variable phase shifter 52 and a variable signal attenuator 54. The LNAs define the system noise temperature at each antenna element 40. The signal attenuators 54 apply their outputs to a power combiner circuit 56a, which combines the outputs of the 7 signal attenuators into a single signal. The power combiner 56a generates an output signal to an input of a diplexer 56b. The diplexer 56b functions to direct the signal received on its "RX" port from the power combiner 56a to the transceiver(s) 30. This forms a direct communication path between the signal attenuators 54 and the transceiver(s) 30. In this manner, the phased array antenna 32 can be interfaced with the transceiver(s) 30 while they are receiving electromagnetic signals.

As will be explained in greater detail in the following paragraphs, the phase shifters 52 and attenuators 54 are controlled by the antenna controller 24 and provide the ability to controllably adjust the antenna array 32 receive distribution in both phase and amplitude, to thereby form any desired receive beam pattern for the antenna array 32, including the dual beam patterns described herein. An additional capability of the beam former subsystem 28 is the ability to form nulls in the antenna pattern in selected directions to minimize the level of interference from other external sources picked up by the antenna array 32. Optionally, the variable signal attenuators 54 could be replaced with variable gain amplifiers for amplitude control without affecting functionality.

The transmit beamformer subsystem 46 includes a plurality of independent transmit channels that each include a phase shifter 58. Each phase shifter 58 is interfaced to a power divider 56c. In a transmit mode, the diplexer 56b receives the transmit signal from the transceiver 30 at is "Comm" port and directs the transmit signal to its "Tx" port. The transmit signal is then output to the input of the power divider 56c. The power divider 56c divides the transmit signal into seven signal components. The seven signal components are then each independently input to an associated one of the diplexers 48, and then output from the diplexers 48 to each of the antenna elements 40. In this manner the transceiver 30 is interfaced to the antenna array 32 during a transmit operation.

The particular beam forming implementation described in connection with beamformer subsystem 28 carries out the beam forming function at RF frequencies using analog techniques. Alternatively, identical functionality in beam pattern control could be provided by performing the beam forming at IF (Intermediate Frequency) or digitally. However, these methods would not be compatible with a transceiver having an RF interface, and would thus require different, suitable hardware components to implement.

General Operation of Beam Former Subsystem

With reference to FIG. 6, a flowchart illustrating major operations performed by the beam former subsystem 28 is shown. A principal objective is to calculate the complex array distribution (amplitude in dB and phase in degrees at each antenna element 40) needed to produce two beams in directions 1 and 2 with a blending factor ($\alpha$). The blending factor ($\alpha$)=0 corresponds to a beam only in direction 1; $\alpha$=1 corresponds to a beam only in direction 2; and $\alpha$=0.5 corresponds to two separate beams with one pointing in direction 1 and the other pointing in direction 2, with the beams having equal gain. At operation 62, the phase distribution (in degrees) needed to steer a single beam in direction 1 is determined. At operation 64, based on the fixed (i.e., scan invariant) single beam amplitude distribution (which can be uniform or tapered) and the calculated phase distribution at operation 62, the complex voltage distribution needed to steer a single beam in direction 1 is calculated. At operation 66, the phase distribution (in degrees) needed to steer a single beam in direction 2 is calculated. At operation 68, using the same fixed single beam amplitude distribution from operation 64 and the phase distribution calculated from operation 66, the complex voltage distribution needed to steer a single beam in direction 2 is calculated.

At operation 70, the complex voltage distribution needed to form the blended dual beams as $(1-\alpha)$ times the complex voltage distribution from operation 64 (beam 1 complex distribution) plus $(1-\alpha)$ times the complex voltage distribution from operation 68 (beam 2 complex distribution), is calculated. This calculation is applied for each antenna element 40.

At operation 72, for the complex blended dual beam distribution from operation 70, convert the complex voltage value at each array element to an amplitude value (in dB) and a phase value (in degrees). At operation 74, the highest amplitude value in dB across the antenna elements 40 is determined. At operation 76, this highest amplitude value is then subtracted from the amplitude value in dB at each antenna element 40 so that the amplitude distribution is normalized (i.e., all values are zero dB or lower). At operation 78, the calculated, blended dual beam amplitude (in dBs) and phase distribution (in degrees) are then applied to the electronically adjustable signal attenuators 54 and phase shifters 52,58 in the beam forming network 28.

Specific Description of Amplitude Control and Phase Shifting Performed by Beamformer Subsystem The following is a more detailed explanation of the mathematical operations performed by the antenna controller 24 in controlling the beam former subsystem 28 to effect control over the amplitude and phase shift of the signals associated with each of the antenna elements 40. Using complex math, the signal processing that occurs in the antenna controller 24 for the received signals from each of the seven antenna elements 40 (I=1-7) is to first multiply each signal by $A_i e^{j\Psi_i}$ where $A_i$ is the desired amplitude shift and $\Psi i$ is the desired phase shift, before combining the signals to form the antenna beam. The beam former output signal, $S_{rx}(t)$, to the receiver in the transceiver subsystem 30 of FIG. 1 is equal to:

$$S_{rx}(t) = \sum_{1}^{n} S_i(t) A_i e^{j\psi_i} \quad (1)$$

Where $S_i(t)$ is the input signal from the $i^{th}$ antenna element 40. The same signal processing is applied in reverse to form the transmit beam. The transmit signal is divided "n" ways (where "n" is the number of antenna elements in the antenna system 32) and then individually amplitude and phase shifted to generate the transmit signal, $S_i(t)$, for each antenna element 40. The term "$S_{tx}(t)$" is the transmit output from the transceiver 30 in FIG. 1.

$$S_i(t) = 1/n S_{tx}(t) A_i e^{j\psi_i} \quad (2)$$

One embodiment of the invention performs the beam former signal processing of equations (1) and (2) in the digital domain using either a general purpose processor or programmable logic device (PLD) loaded with specialized software/firmware, or as an application specific integrated circuit (ASIC). A second embodiment may employ analog signal processing methods that employ individual variable phase shifters, variable attenuators and divider/combiners.

A significant advantage of the ART 10 of the present invention is that only a single beam former and a single port is needed to generate a beam having a dual lobed configuration. This is accomplished by the phase and amplitude control over each antenna element 40 to synthesize an antenna beam having the desired characteristics needed to achieve the soft handoff between two BTS sites. Specifically, the beam forming network 28 (FIGS. 1 and 5) calculates a phase-amplitude distribution which is the complex sum of the two individual single-beam distributions to form a pattern with high gain in two specified directions (i.e., a dual-lobed beam).

The following describes a preferred beam synthesis method used by the ART 10. The following beam synthesis processing occurs in the antenna controller 24 of FIG. 1.

For a single steered beam in the direction $(\theta,\phi)$ in spherical coordinates with the antenna array 32 in the XY-plane, a preferred embodiment of the invention assumes an amplitude distribution $A_i$ that is uniform:

$$A_i = 1; i=1, n \quad (3)$$

and the phase distribution $\Psi_i$ is given by:

$$\psi_i = k \sin\theta(x_i\cos\phi + y_i\sin\phi); i = 1, n \quad (4)$$

$$\left(k = \frac{2\pi}{\lambda}\right)$$

where $\lambda$ is the free space wavelength of the operating frequency of the antenna, and k is the free space wave number. The complex voltage distribution $V_i$ is therefore:

$$V_i = e^{-jk \sin\theta(x_i \cos\phi + y_i \sin\phi)}; i=1, n \quad (5)$$

For a dual beam distribution forming beams in the directions $(\theta_1,\phi_1)$ and $(\theta_2,\phi_2)$ the constituent complex single beam distributions are $V_{i1}$ and $V_{i2}$ respectively given by applying the two beam steering directions to equation (5) giving:

$$V_{i1} = e^{-jk \sin\theta_1(x_i \cos\phi_1 + y_i \sin\phi_1)}; i=1, n$$

$$V_{i2} = e^{-jk \sin\theta_2(x_i \cos\phi_2 + y_i \sin\phi_2)}; i=1, n) \quad (6)$$

The resultant dual beam distribution is the complex mean of the constituent single beam distributions:

$$V_{iDB} = (V_{i1} + V_{i2})/2; i=1, n \quad (7)$$

Note that for a receive-only system, the power normalization is arbitrary if the system noise temperature is established prior to the beam former or if the system is external interference rather than thermal noise limited. For a transmit system the formation of simultaneous dual beams must incur some loss unless the constituent beams are orthogonal, and the dual beam distribution amplitudes will be modified by some scaling factor relative to equation (9). One way of calculating the amplitude normalization is to calculate the amplitude coefficients across the array antenna elements 40 and divide these by the largest value, so that one attenuator is set to 0 dB and the others are set to finite attenuation values. Alternatively it can be shown that it is possible to form simultaneous dual beams with phase-only distribution control, albeit with poorer efficiency for some beam separation angles (see FIG. 11). In this case the amplitude distribution remains uniform with the phase distribution given by the phase terms of the distribution defined by equation (9).

The complex distribution voltage at a single element from equation (5) is shown graphically in FIG. 7. The resultant complex dual beam distribution is expressed as:

$$V_{iDB} = A_{iDB} e^{j\Psi_{iDB}}; i=1, n \quad (8)$$

where $A_{iDB}$ and $\Psi_{iDB}$ are the amplitude and phase respectively. These are given by:

$$A_{iDB} = \sqrt{2 + 2 \cos(\psi_{i1} - \psi_{i2})}; i = 1, n \quad (9)$$

$$\psi_{iDB} = \arctan\left(\frac{\sin\psi_{i1} + \sin\psi_{i2}}{\cos\psi_{i1} + \cos\psi_{i2}}\right); i = 1, n \quad (10)$$

Additional Analysis of Antenna Performance and Theory

Further to the above description of how the dual lobes of the beam of the antenna system 32 are formed, the following analysis is presented to further aid in the understanding of the performance of the seven-element antenna array shown in FIGS. 3a, 3b and 4. Again, it will be appreciated that phased array antennas having other numbers of elements and of various sizes could be implemented with the present system.

The exact phased array geometry of the antenna system 32 is shown in graphical form in FIG. 8. Six elements are hexagonally spaced with a seventh element at the center. The element spacing is 0.42$\lambda$, which was previously selected for maximum gain. The amplitude distribution for the single beam patterns is uniform. All the results presented below are for cases where the lobes are directed to the horizon in the plane of the array. The lobes can be pointed at any elevation angle but for simplicity, this discussion involves only cases where beams are scanned towards the horizon because this is the most common operational condition, particularly during hand-off from one BTS to the next. The term "$\phi$" is the azimuth angle along the horizon and $\phi=0°$ is the direction towards the right side of the page. This analysis demonstrates the synthesis of dual lobe patterns where one lobe is always pointing at $\phi=0°$ and the other lobe is offset from it by $\Delta\phi$, although the first lobe can be synthesized as readily at any specified azimuth pointing angle.

Vertically polarized $\lambda/4$ monopole antenna elements are assumed. The gain patterns resulting from a preferred beam synthesis method are shown in FIG. 9 for the cases of $\Delta\phi=0°$, 30°, 60°, 90°, 120°, 150° and 180°. These are plots of antenna gain where the center of the circle is the direction normal to the plane of the antenna system 32 (straight down towards the earth when the antenna system 32 is mounted horizontally on the undercarriage 34 of the aircraft 12 in level flight). The outside of the circle is a direction along the plane of the antenna system 32 (towards the horizon when the antenna system 32 is mounted on an aircraft in level flight). The colors depict the magnitude of antenna gain (directivity) with red/orange representing highest gain and blue being lowest gain (the order of magnitude, from highest to lowest, being red/orange, yellow, green, light blue, dark blue). FIG. 8 clearly demonstrates that a preferred beam synthesis method of the present invention accomplishes the intended function of producing two lobes that are independently steerable in two different directions.

The antenna gain along the horizontal plane (azimuth cut in antenna terminology) is depicted in the polar plots of FIG. 10. The gain normalized to the peak gain with a single lobed pattern is measured from the center of the circle with 0 dB at the outside of the circle and −20 dB at the center. The azimuth angles around the circle are labeled on the plots.

Of particular interest in evaluating the performance of the antenna system 32 is the variation in peak gain that occurs as a single lobe is separated into two lobes. It would be reasonable to assume that the peak gain of dual lobes should be 3 dB less than that of a single lobe, since the available antenna gain is split equally between the two lobes. For a single beam in the θ=90° plane, the beam peak gain varies between 12.7 dBi and 13.1 dBi, depending on the azimuth beam pointing angle. For two separate lobes therefore there is an expectation that the gain for each beam will typically be around 10 dBi (3 dB below the single-beam gain).

Figure 11:
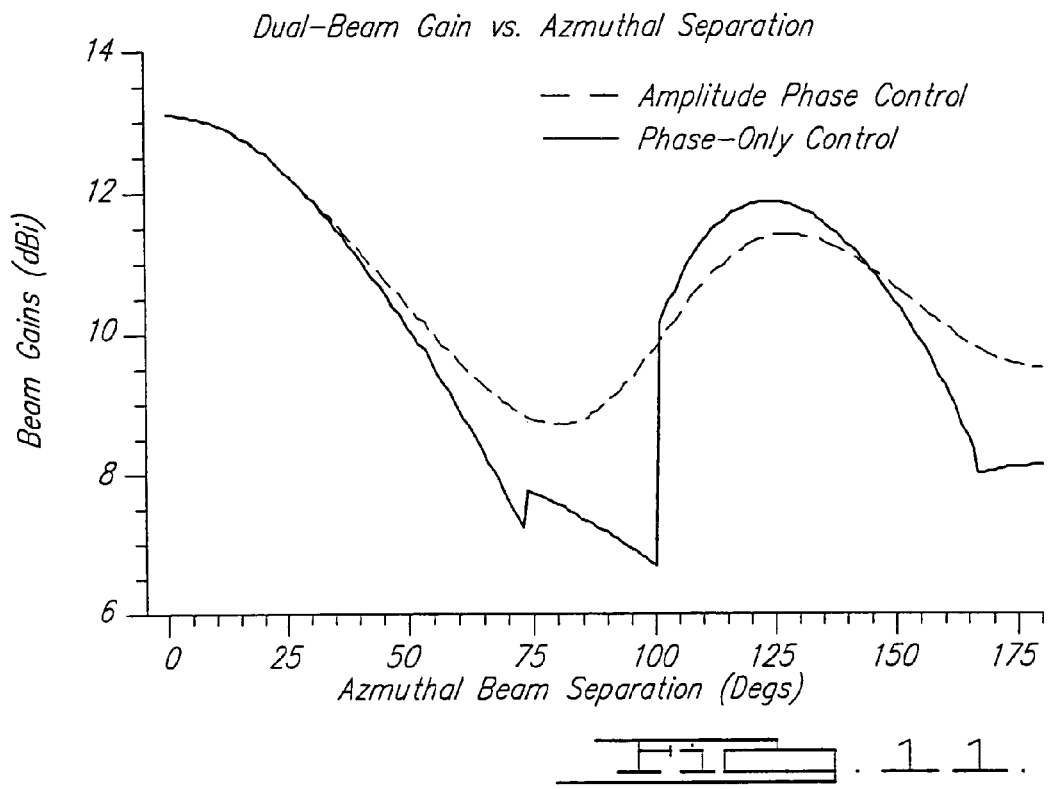
FIG. 11 is a graph of the dual beam gain versus azimuthal separation for amplitude phase control and phase-only control, of the phased array antenna system implemented in the present invention.

FIG. 11 plots the dual-lobe gain vs. azimuthal beam separation. For both the "Amplitude and Phase Control" and "Phase-Only Control" cases there is only a single curve visible, as the gains of the two lobes are identical.

For 0° separation, the two lobes merge into a single lobe with a gain of 13.1 dBi. For finite separations the gain is reduced, however with the exception of a dip in the gain curve at around 80° to a little below 9 dBi, gain values on each lobe of around the expected 10 dBi or greater are realized. Note (see the following contour and polar pattern plots of FIGS. 13 and 14 for details) that for lobe separations below around 80° there is essentially just a single broadened lobe, which eventually bifurcates into two separate lobes.

Single→Dual→Single Lobe Soft Transition (Blending)

A significant feature of the present invention is the soft handover from one lobe (pointing direction) to another that is implemented by a gradual transfer of pattern gain from one pointing direction to a new pointing direction, as opposed to abrupt transitions from a single lobe in direction 1 to a dual lobe covering both directions, and then from the dual lobe to a single beam in direction 2.

Figure 12:
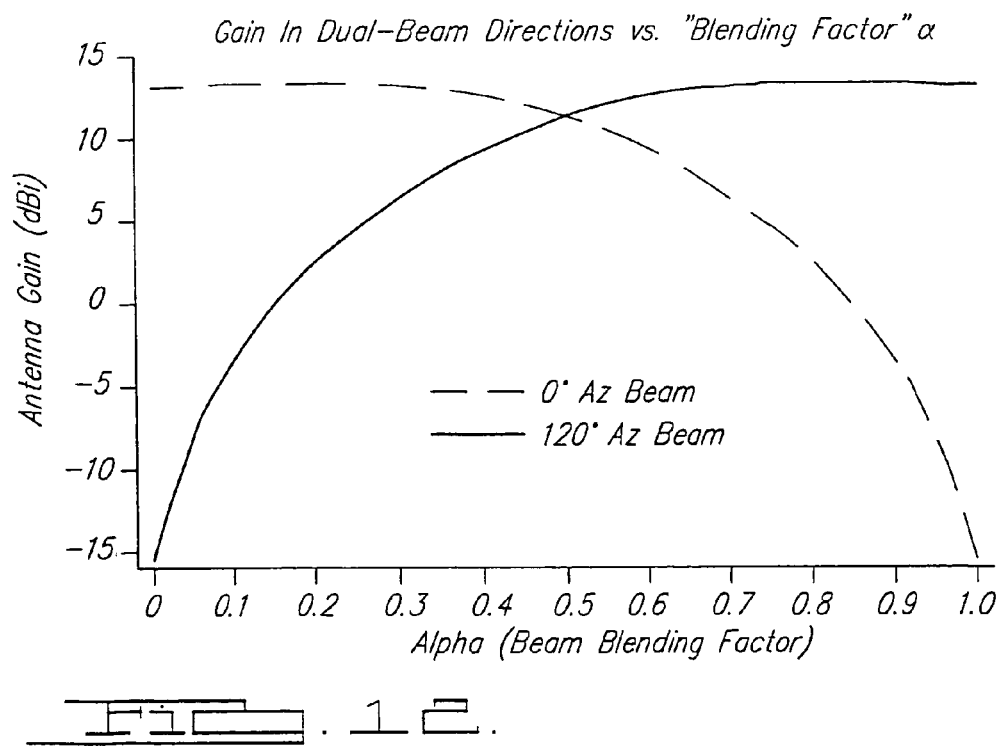
FIG. 12 is a graph of the gain in the dual-beam directions of the antenna of the present system versus the "blending factor" α.
Figure 13A:
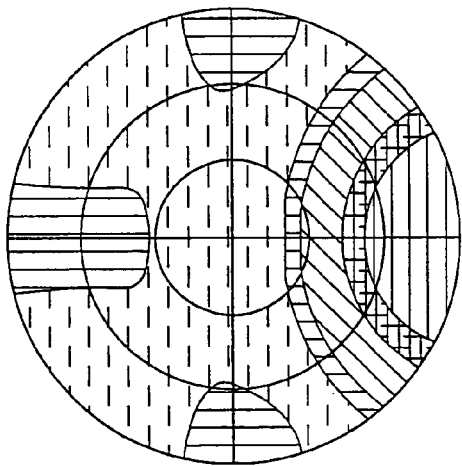
FIGS. 13a-13k present predicted blended patterns versus α as false color contour plots of the two lobes of the beam, starting with only a single lobe, transitioning to a dual lobe pattern, and then back to a single lobe, in the α=90° plane.
Figure 13B:
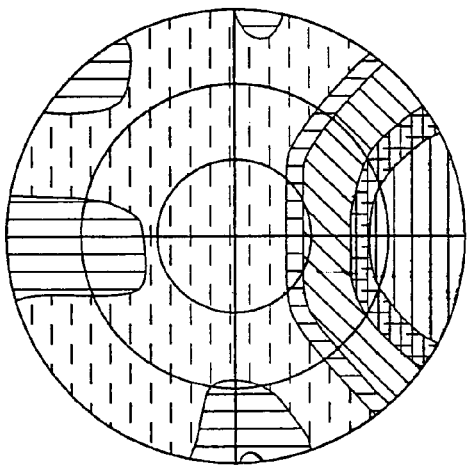
Figure 13C:
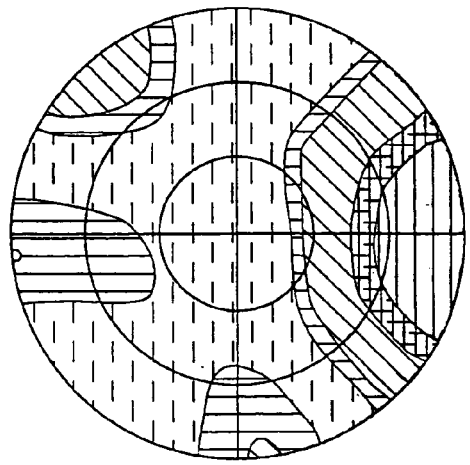
Figure 13D:
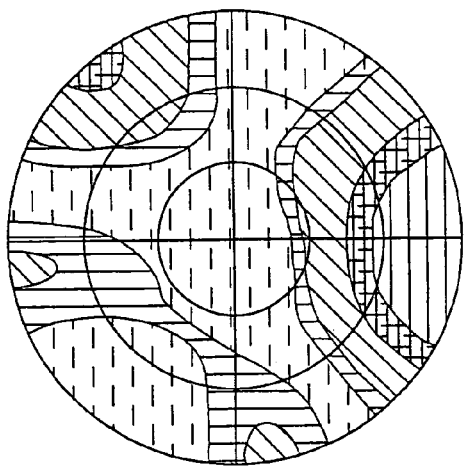
Figure 13E:
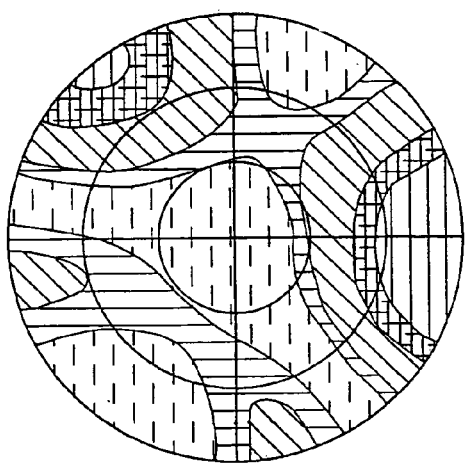
Figure 13F:
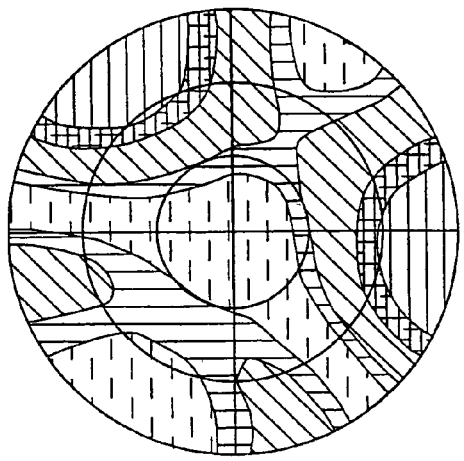
Figure 13G:
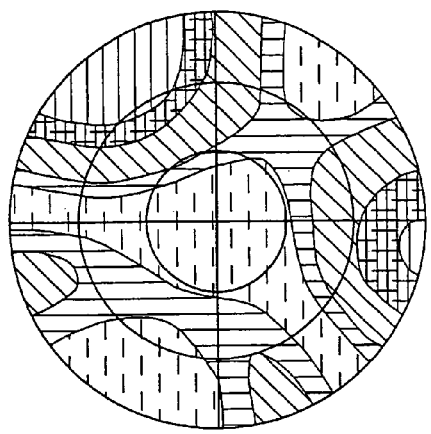
Figure 13H:
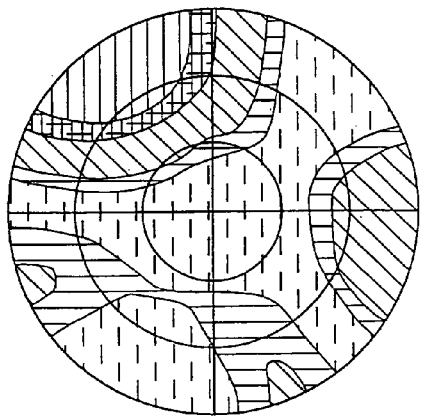
Figure 13I:
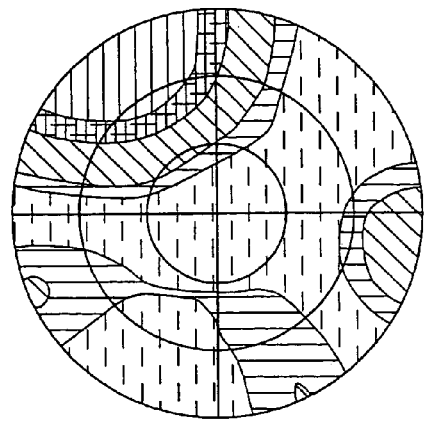
Figure 13J:
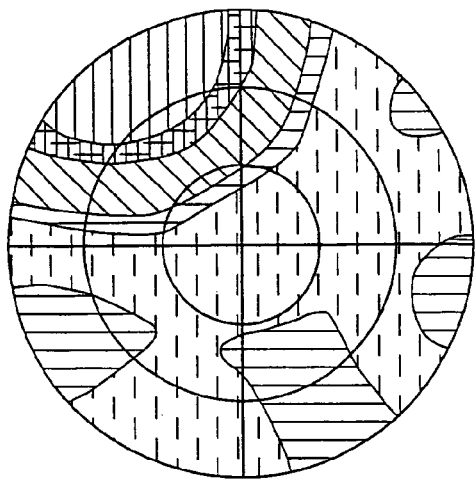
Figure 13K:
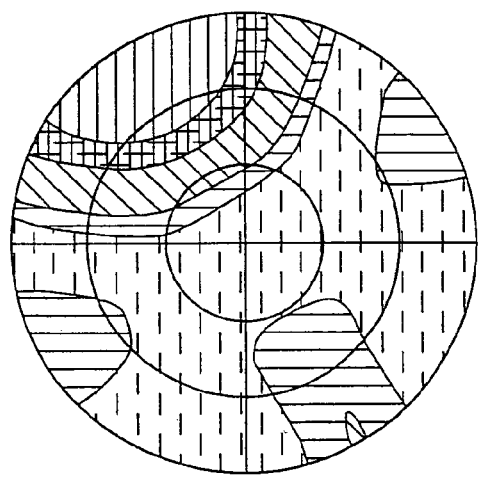

The beam forming network 28 (FIG. 1) implements such a gradual pattern transition by linearly "blending" the complex array distributions for the individual single lobed beams. The resultant distribution and pattern is characterized by the "blending factor" α, with α=0 corresponding to a single beam in the first direction, α=1 corresponding to a single beam in the second direction, and α=0.5 corresponding to a dual-lobe pattern providing high gain in both directions. FIG. 12 plots the antenna pattern gain in the two pointing directions (both in the θ=90° or horizon plane), with the lobe pointing directions separated by 120° in azimuth.

For a "blended" lobe beam distribution with a blending factor of α (α=0 corresponds to a pure single lobe in the first direction, and α=1 corresponds to a pure single lobe in the second direction), the distribution is calculated by a modification to equation (7):

$$V_{iDB} = (1-\alpha)V_{i1} + \alpha V_{i2}; i=1, n \quad (11)$$

Figure 14A:
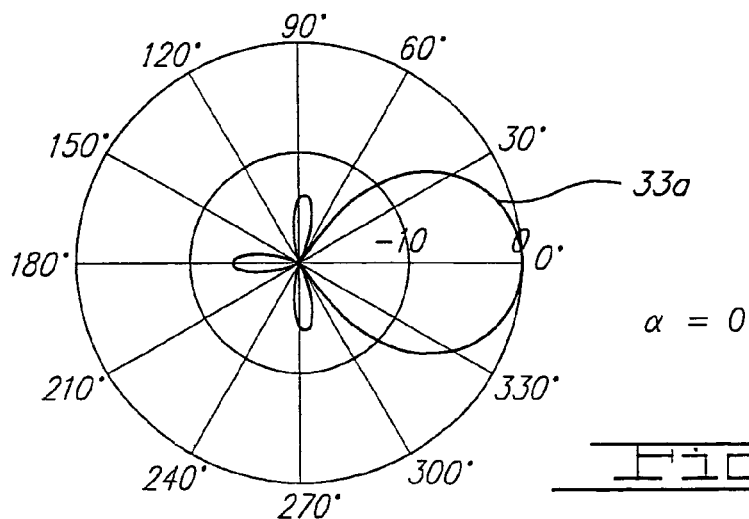
Figure 14J:
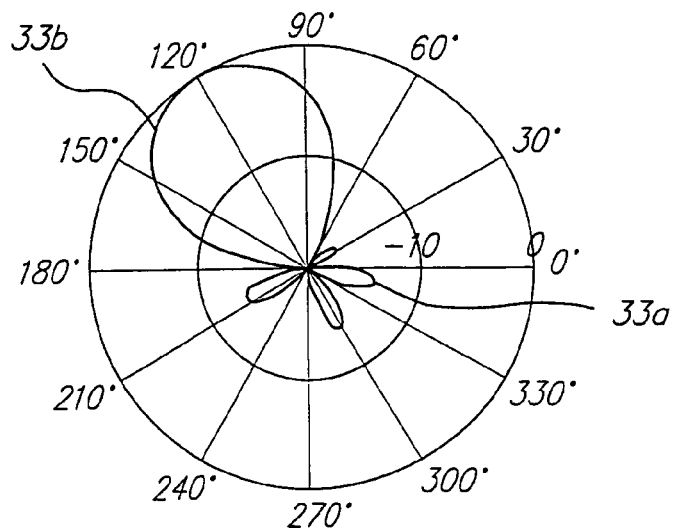
Figure 14K:
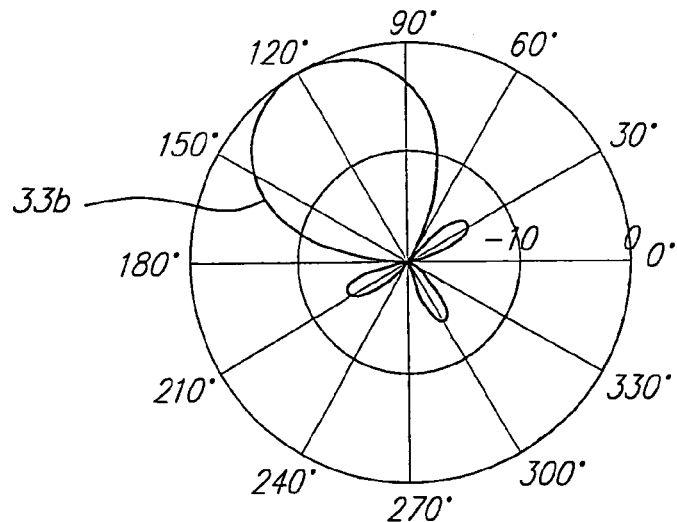

FIGS. 13 and 14 present predicted blended patterns vs. α as false color contour plots and polar plots in the θ=90° plane respectively. In all cases the azimuthal separation between the two pointing directions is 120°, with one lobe at 0° and the other at 120°. FIGS. 13 and 14 clearly demonstrate that the beam forming network 28 can accomplish a gradual transition from a single lobe beam pointing in one direction, to a dual lobed beam pointing in two directions, and back to a single lobe beam pointing in the second direction using the blending factor α.

Terrestrial Applications of Preferred Embodiments

Although a preferred embodiment of the ART 10 has been described in connection with a commercial aircraft, the system and method of the present invention is applicable with any cellular network in which communication between the BTSs and the mobile platforms is predominantly line-of-sight. Such applications could comprise, for example, aeronautical cellular networks, without the multipath fading and shadowing losses that are common in most terrestrial cellular networks. Accordingly, the preferred embodiments can readily be implemented in ATG communication networks where the mobile platform is virtually any form of airborne vehicle (rotorcraft, unmanned air vehicle, etc.).

Figure 15:
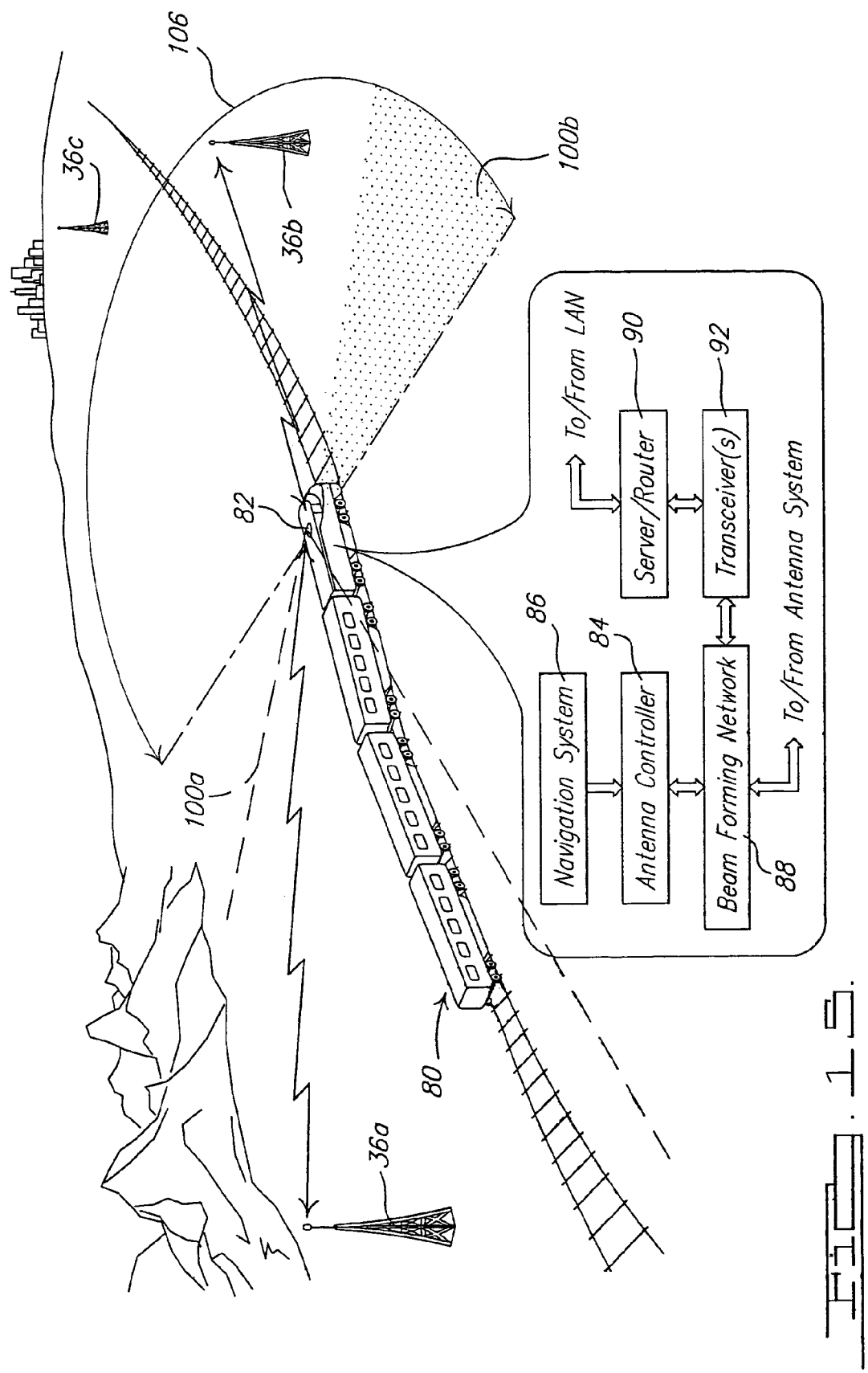
FIG. 15 is a simplified diagram illustrating a terrestrial application for an alternative preferred embodiment of the present invention.

The preferred embodiments could also be applied with minor modifications to terrestrial networks where the mobile platform (car, truck, bus, train, ship, etc.) uses a directional antenna. Such an implementation will now be described in connection with FIGS. 15 and 16. FIG. 15 illustrates a land based vehicle, in this example a passenger train 80. The train 80 includes an antenna system 82 mounted on a roof portion. Antenna system 80 in this example comprises a phased array antenna functionally identical to phased array antenna system 32, except that the radiating elements are adapted to be supported such that they extend upwardly rather than downwardly as in FIG. 3b, so that the antenna pattern is formed in the upper rather than lower hemisphere. The train 80 carries an antenna controller 84, a navigation system 86 a beam forming network 88, a server/router 90 and a transceiver 92. Components 84, 88, 90 and 92 operate in the same manner as components 24, 28, 22 and 30, respectively, of the embodiment described in connection with FIG. 1. Navigation system 86 may only need to monitor the heading of the train 80 (i.e., in one dimension, that being in the azimuth plane), if it is assumed that the train will not experience any significant degree of pitch and roll, and will not be operating on significant inclines or declines that would significantly affect the pointing of its fixedly mounted phased array antenna system 82. This is also in part because of the relatively wide beam pattern which typically is in the range of about 30 degrees-60 degrees. This would be expected with a mobile platform such as a passenger train or other mobile land or marine vehicle. In this implementation, a simple electronic compass may suffice to provide the needed heading information.

With a smaller, more maneuverable mobile platform such as a van, for example, it might alternatively be assumed that more significant pitch and roll of the vehicle will be experienced during operation, as well as travel over topography having significant inclines or declines. In that instance, the navigation system 86 would preferably include angular rate gyroscopes or similar devices to report the vehicle's instantaneous orientation to the antenna controller 84 so that more accurate beam pointing can be achieved. In either event, however, a land based vehicle is expected to present less challenging beam pointing because the great majority of pointing that will be needed will be principally in the azimuth plane.

With reference to FIGS. 15 and 16, it will be assumed that a cellular communications link is established with a first BTS site 36a (operation 94 in FIG. 16). As the train 80 travels, the navigation system 86 periodically checks the heading (and optionally the attitude) of the train, for example every 30 seconds, and updates the antenna controller 84 in real time, as indicated at operation 96. At operation 98, the antenna controller 84 controls the beam forming network 88 so that a first lobe 100a of a beam from antenna system 82, having a first gain, is scanned about a limited arc in the azimuth plane, as indicated by dashed line 102. The antenna controller and the beam forming network 88 are used to modify the pointing of the first lobe 100a in real time as needed to maintain the first lobe 100a pointed at the first BTS 36a, and thus to maximize the quality of the link with first BTS site 36a, as indicated at operation 104.

While the train 80 is traveling, the antenna controller 84 controls the beam forming network 88 to generate a second lobe 100b (represented by stippled area) from the beam from the antenna system 82, that preferably has a lesser gain than lobe 100a. Lobe 100b is continuously scanned about a predetermined arc in the azimuth plane as indicated by arc line 106 in FIG. 15. The second lobe 100b is used to receive RF signals in real time from one or more different BTS sites 36b and 36c shown in FIG. 15 (i.e., BTS sites within arc line 106), as also indicated in operation 108 (FIG. 16), that may be available to form a higher quality link with. In this regard, the second lobe 100b is used to continuously "hunt" for a different BTS site that may be available, or about to become available within a predetermined short time, that would form a higher quality link than the link with BTS site 36a.

At operation 110 in FIG. 16, the antenna controller 84 uses a suitable algorithm that takes into account the signal strength of the signals received from different BTS sites 36b and 36c, as well as the heading of the train 80, to determine in real time if a new BTS site has emerged that provides a higher quality link than the existing line with BTS site 36a, or which is expected to provide a higher quality link within a predetermined time. If the locations of all the BTSs are known and listed in a look-up table, then the second beam can be directly pointed in the direction of the BTS which will shortly become the closest. If BTS location data is not known a priori, the second beam would operate in a search mode, being swept across a specified angular sector until a valid signal from the new BTS is acquired. The algorithm is executed repeatedly as RF signals are received via the second lobe 100b. In this example, the train 80 is leaving the coverage cell formed by BTS site 36a and moving in the coverage cell provided by BTS site 36b. Accordingly, BTS site 36b thus forms the next site that a handoff will be made to. At operation 112, a soft handoff is effected from BTS site 36a to BTS site 36b by gradually reducing the gain of the first lobe 110a while the gain of the second lobe 110b is gradually increased. The link with BTS site 36a is thus gradually broken while a new (i.e., sole) communications link is formed with BTS site 36b. After this occurs, the second lobe is re-designated as the primary (i.e., "first" lobe) by the antenna controller 24, as indicated at operation 114, and the sequence of operations 96, 98, 104, 108, 110, 112 is repeated. In the present example, the link with BTS site 36b will be maintained until the train 80 gets sufficiently close to BTS site 36c, at which time a soft handoff will be commenced pursuant to the operations of FIG. 16 to transfer the communications link from BTS site 36b to BTS site 36c.

Point-To-Multipoint Communications System

The various preferred embodiments described herein can also be implemented to form a wireless, point-to-multipoint communications system 200, as illustrated in FIG. 17. The system 200 can be configured to enable either one-way communication channels or full duplex communication channels. The system 200 makes use of the antenna controller 24, the beam forming network 28 and the transceiver 30 described in connection with the ART 10 in FIG. 1. The operation of these components is also identical with that described in connection with ART 10. Also, an antenna 202 (orientated either vertically or horizontally), in this example a phased array antenna, is used for signal radiating and reception purposes. The antenna 202 is also interfaced with the beam forming network 28, as with the ART 10 in FIG. 1.

With the system 200, the beam forming network 28 is located at a fixed, ground station 201. The horizontally oriented antenna 202 may be located on a suitable tower and is used to generate one, two or more generally narrow, independently steerable lobes. In this example, lobes 204a and 204b are illustrated, but a greater or lesser number of independently formed lobes could be employed to suit a given application. The lobes 204a and 204b enable independent, one-way or full duplex communications links to be established with a pair of airborne mobile platforms 206a and 206b. The independent steerability of the two lobes 204a and 204b enables the movement of the lobes to be controlled to track the movement of the aircraft 206a and 206b as needed, and thus to simultaneously maintain the communication link with each aircraft 204a and 204b.

An alternative configuration of the system 200 could just as readily involve the use of separate transmitter and receiver at the fixed ground station. In this embodiment, the transmitter would be connected directly to the transmit beam former, while the receiver would be connected directly to the receive beam former. This embodiment would eliminate the need for the central diplexer 56c in FIG. 5.

Another advantage of the system 200, as well as the system 10 and the system 100, is that by controlling the gain associated with each lobe 204a,204b, different data rates can be established for the two lobes 204a,204b. For example, if lobe 204a is being used to communicate with a remote terminal that is located in an area experiencing poor weather conditions, the gain of lobe 204a can be controlled accordingly to maintain a minimum acceptable data rate. Alternatively, the gain of each lobe 204a, 204b can be set differently if one lobe is being used to communicate high priority information or mission critical information, while the lobe is being used to communicate information of lesser importance. The gains of each lobe 204a, 204b can also be adjusted in accordance with the distances of the two airborne mobile platforms from the fixed ground station 201.

Figure 18:
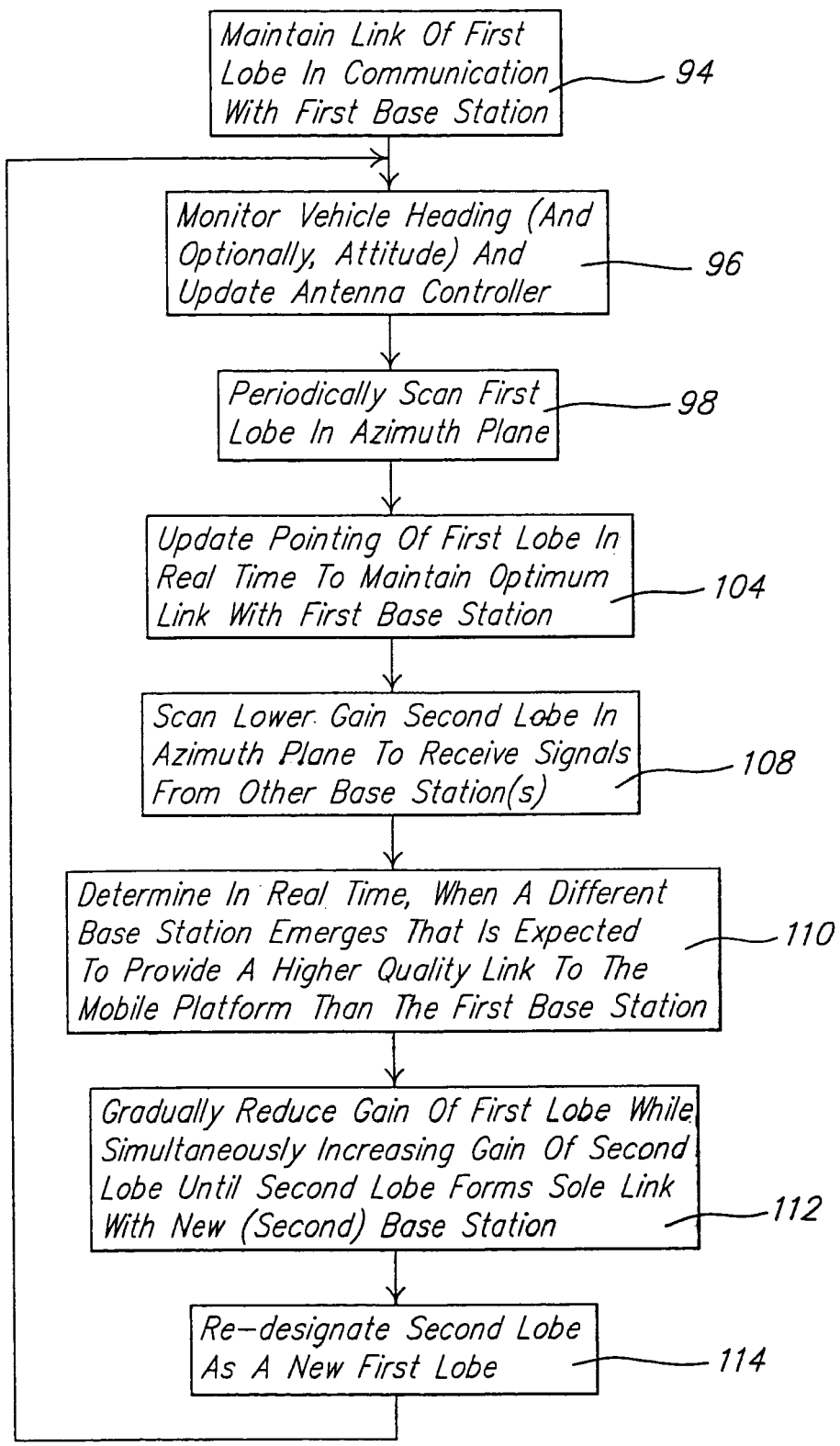
FIG. 18 is a perspective view of a phased array antenna for use with the system of FIG. 17.

Referring to FIG. 18, the antenna 202 is shown in greater detail. The antenna 202, in this example, includes seven columns of radiating/reception elements 208. Each column is interfaced to a separate port on the beam forming network 28. Separate transmit and antenna beam formers, as illustrated in FIG. 5, can be used, or a single beam former with a diplexer for separating and routing the transmit and receive signals could be employed. Using separate beam formers for transmit and receive operations, however, would provide higher antenna gain in the direction of each aircraft 204a, 204b, thus allowing higher data rates to be used. While this example illustrates the antenna 202 with seven columns of elements 208, a greater or lesser number of columns, as well as a greater or lesser number of elements 208 in each column, could be implemented to suit a specific application.

Figure 17A:
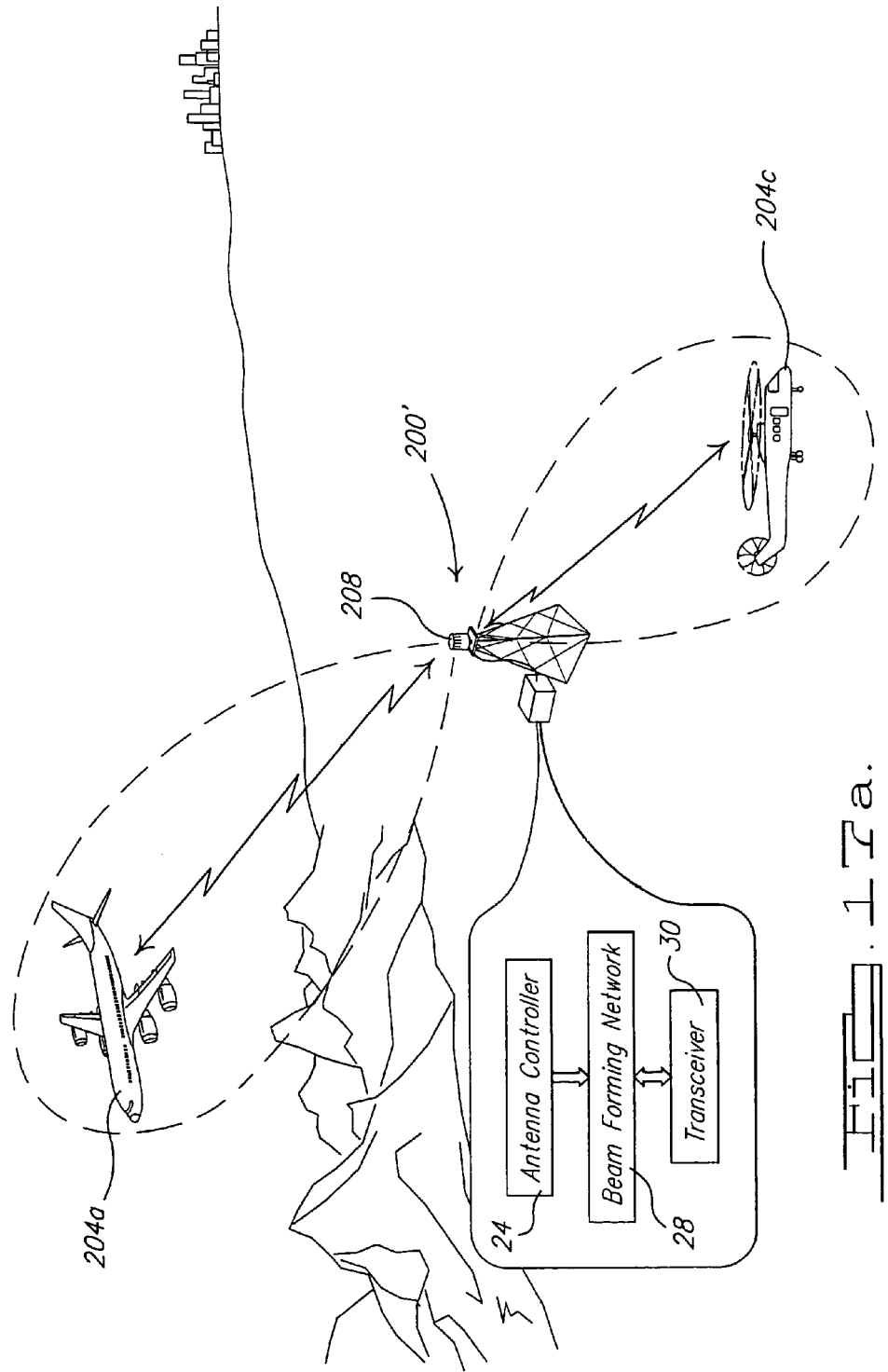
FIG. 17a is a simplified diagram illustrating an alternative point-to-multipoint system in which a circular phased array antenna is used to provide 360 degree azimuth coverage.

To maximize the coverage of the system 200 to 360 degrees coverage in azimuth, an alternative preferred implementation could involve the use of a conventional cylindrical phased array antenna. Such a system 200' is shown in FIG. 17a. The antenna elements of a cylindrical phased array antenna 208 could be arranged in three distinct sectors, for example sectors of 120 degrees in azimuth, to provide full 360 azimuth coverage. With this embodiment, a plurality of independently steerable lobes 204 could be created and steered as needed from each of the sectors of the cylindrical phased array antenna to maintain communication channels with one, two or more remote, mobile terminals 204a and 204c over any azimuth region.

Figure 19:
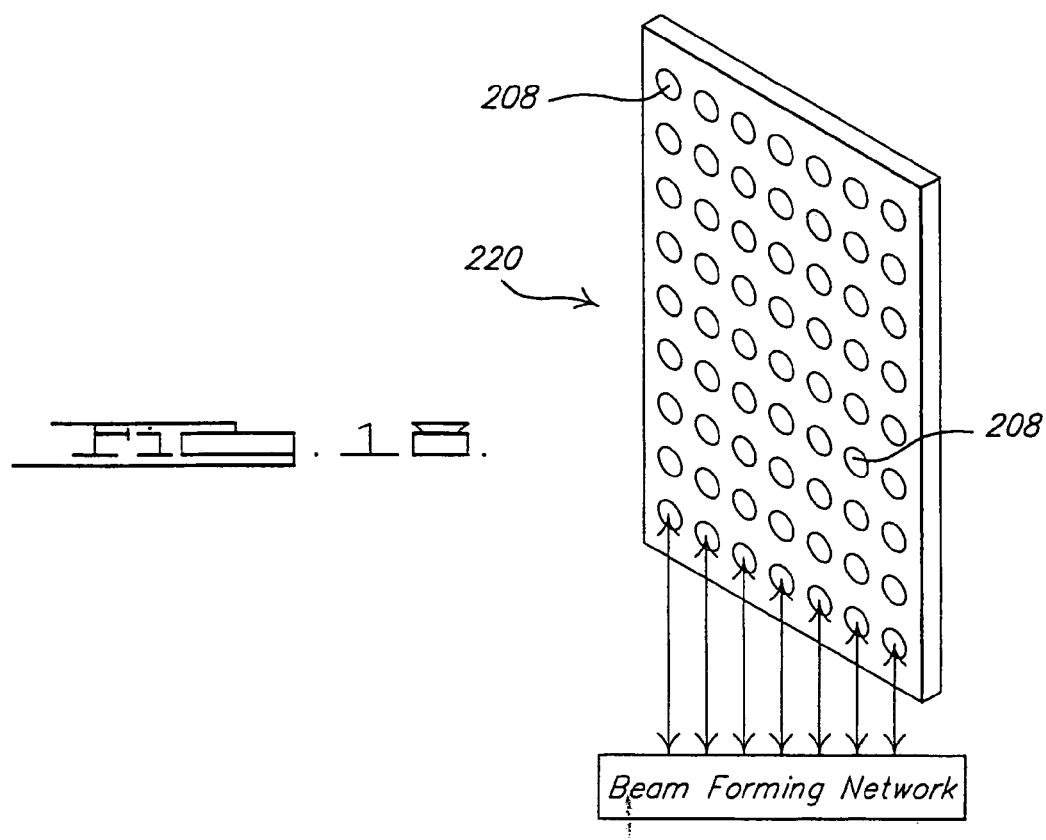
FIG. 19 is a simplified side cross sectional view of a Gregorian antenna for use with the system of the present invention.

Referring to FIG. 19, a system 300 in accordance with an alternative preferred embodiment of the present invention is shown. The system 300 makes use of a vertically mounted phased array antenna 302, and scanning is performed only in the azimuth plane. The antenna 302 generates two independently steerable lobes 304a,304b from a single beam. The lobes 304a,304b are used to create one-way or full duplex communications links with terminals located at separate, remotely located ground-based facilities 306a and 306b. While only two lobes 304a,304b are illustrated, again, a greater or lesser number of independently steerable lobes could be formed.

Figure 20:
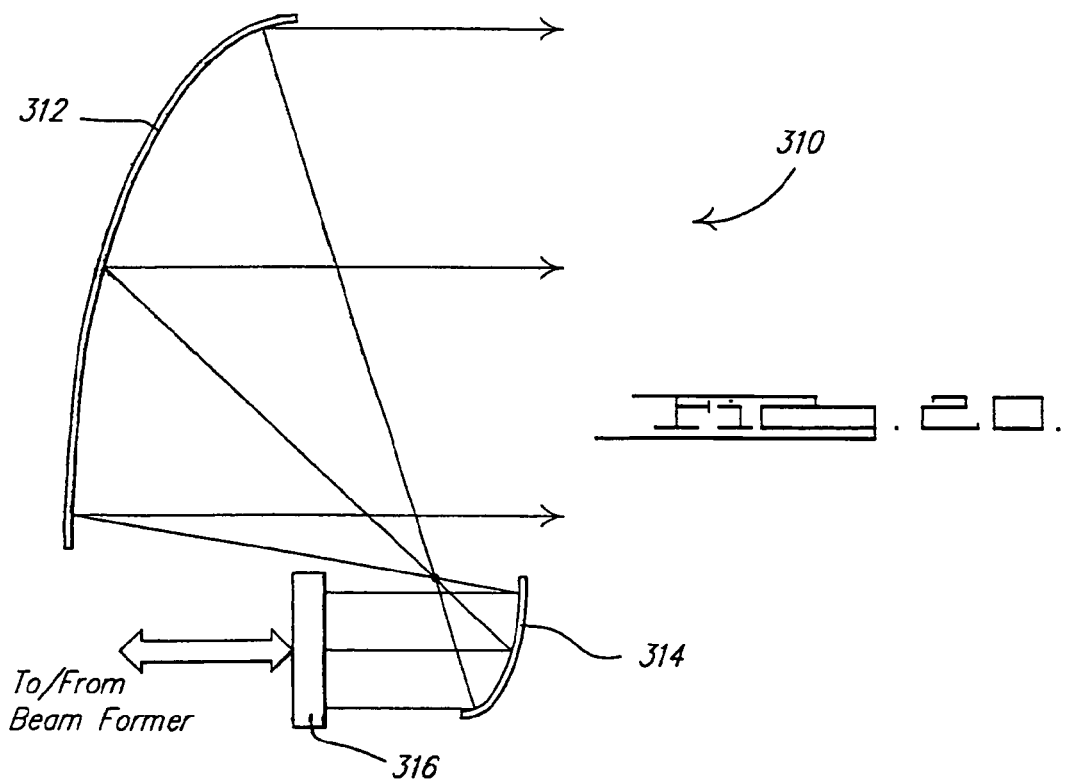
FIG. 20 is a diagram of an alternative preferred implementation of the present invention, in which the multi-lobe beam is generated from a mobile ground-based vehicle.
Figure 19:
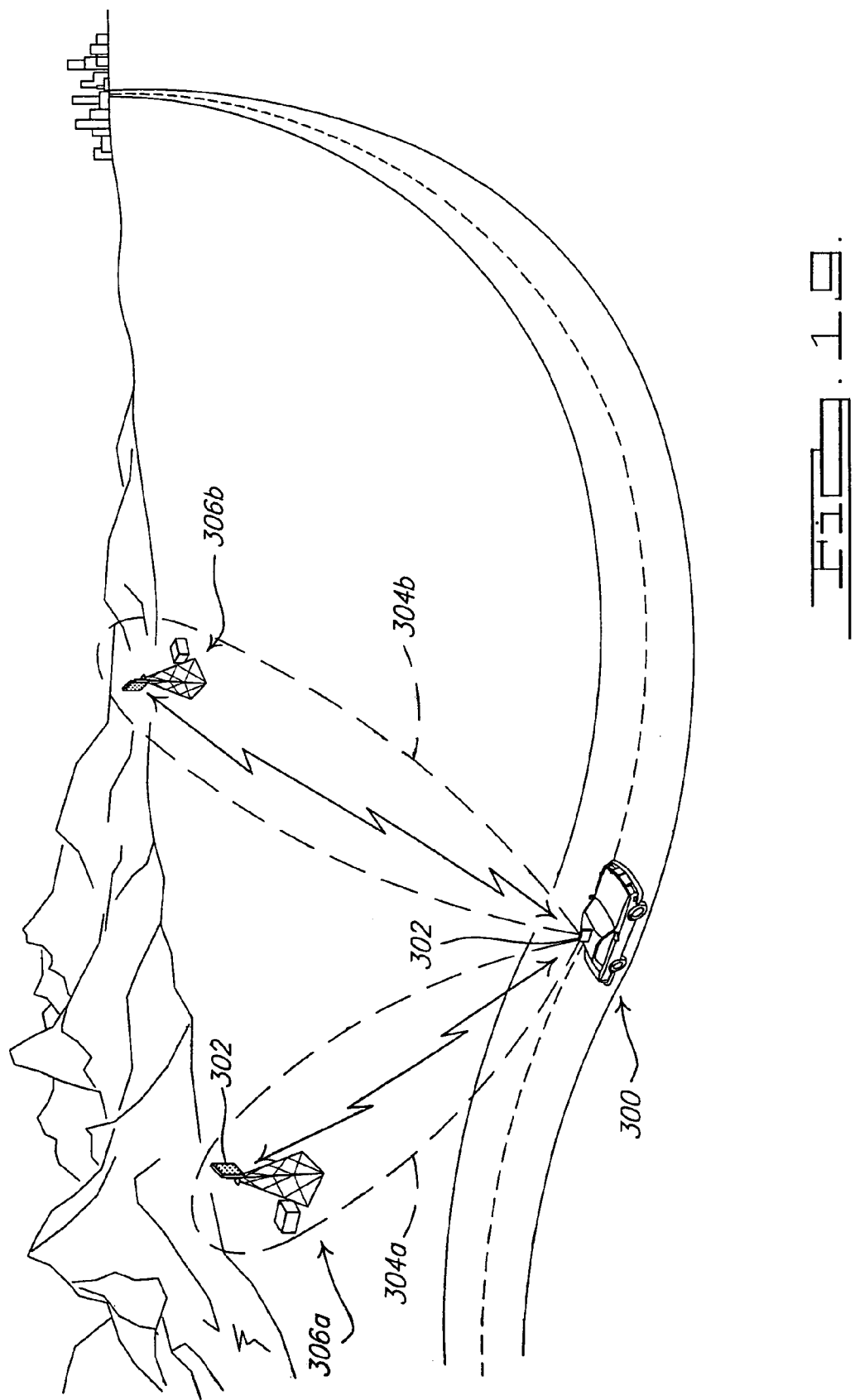

With the system 200, 200' or 300, an alternative antenna that could be used is a conventional near field, Gregorian antenna 310, as shown in FIG. 20. The Gregorian antenna 310 has a parabolic shaped main reflector 312, a parabolic shaped subreflector 314 and a small feed array 316, with the main reflector 312 and subreflector 314 having a common focus. The patterns obtained from the Gregorian antenna 310 and essentially identical to those obtained with the phased array antenna 202 except that they are compressed in the angular domain by a factor equal to the "magnification factor" of the reflector system (i.e., reflector 312 and subreflector 314). The Gregorian antenna 310 can scan in both the azimuth and elevation planes, depending upon the feed array that is used with it.

It will be appreciated that even for communicating between a ground-based station and multiple airborne mobile platforms, such as fixed wing aircraft or rotorcraft, that beam steering in the elevation plane will often not be required. Often, beam steering in the azimuth plane will be all that is required to track the airborne mobile platforms. The elevation plane pattern of the independent lobes can therefore be shaped to provide increased gain at low elevation angles where the gain will be needed most. For those situations where one or more lobes must be able to track an airborne mobile platform traveling almost directly overhead, it will be appreciated that the amount of antenna gain required to close the communications link will be much reduced, primarily because of the reduced path loss associated with the much shorter range to the fixed base station. As such, vertical scanning may still not be required, depending on the elevation plane pattern of the lobes.

Referring to FIG. 21, a system 400 is shown in accordance with another alternative implementation of the present invention. System 400 is essentially identical to system 200 with the exception of a vertically oriented, fixedly located phased array antenna 402. Antenna 402 is used to generate two lobes 404a,404b from a single beam. The lobes 404a,404b may be used to form one-way or full duplex communications links. The lobes 404a,404b are used to track and communicate with RF terminals inside of two mobile land vehicles 406a and 406b, simultaneously. While only two lobes 404a,404b are illustrated, a greater or lesser number of steerable lobes could be created as needed for a specific implementation.

Figure 22:
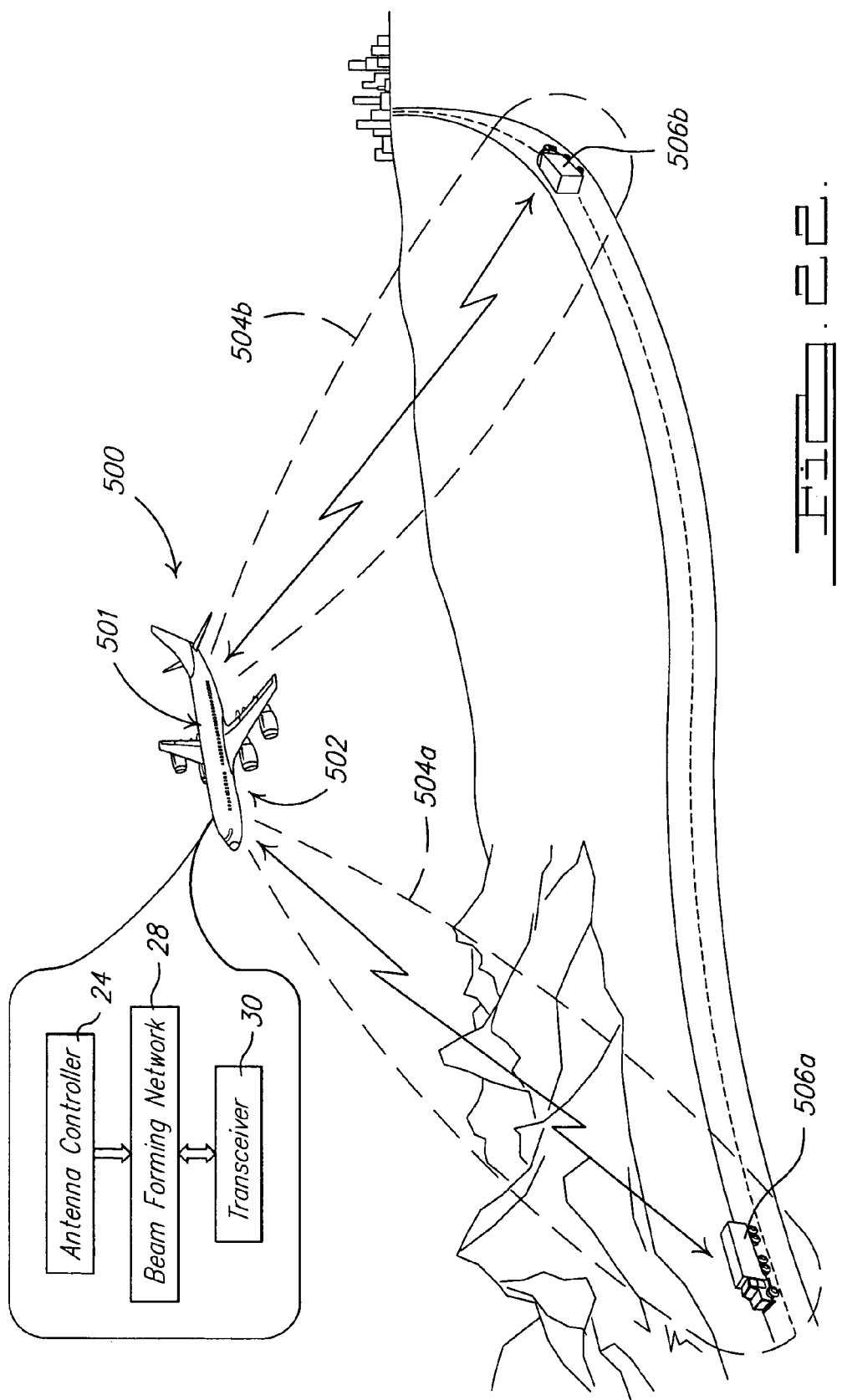
FIG. 22 is a diagram of an alternative preferred implementation of the present invention in which the multi-lobe beam is generated from an airborne mobile platform.

FIG. 22 illustrates a system 500 in accordance with an alternative implementation of the present invention in which an aircraft 501 having an antenna 502 is used to project independently steerable lobes 504a,504b from a single beam to the Earth's surface. The dual lobes 504a,504b are used to independently track and communicate with RF terminals in mobile land vehicles 506a and 506b. Again, two lobes 504a, 504b are shown only for illustration purposes, and a greater or lesser number of lobes 504 can be implemented to suit the needs of a specific application.

FIG. 23 illustrates a system 600 in accordance with another preferred implementation of the present invention. System 600 illustrates a marine vessel 602 from which a single beam having independently steerable lobes 604a,604b communicates with a plurality of RF terminals located in underwater vessels 606a and 606b. Again, more or less than two independently steerable lobes 604 could be used depending on the needs of a particular application. It will be also be appreciated that another implementation could involve one surface marine vessel serving as a "central" terminal, and one or more other marine surface vessels serving as remote terminals communicating on independent communications links with the central terminal.

Referring to FIG. 24, still another implementation 700 is shown that involves a fixed base station 702 having a planar phased array antenna 704. The base station 702 communicates with a pair of fixed, remote terminals 706a and 706b via independently steerable lobes 708a and 708b, respectively. Again, only two remote terminals 706 have been illustrated, but a greater or lesser number of remote terminals could be employed. Additionally, one of the lobes 708 could be fixed on a stationary remote terminal, while the other lobe 708 is independently steered to track a mobile platform.

From the foregoing description, it will also be appreciated that while the term "aircraft" has been used interchangeably with the generic term "mobile platform," the system and method of the present invention is readily adapted for use with any airborne, land-based, space-based or sea-based vehicle or platform, and can be applied to any cellular communication network.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A point-to-multipoint communications system comprising;
    an electromagnetic wave antenna system for generating at least a pair of independently steerable lobes from a single beam, said lobes being used to communicate independently with a plurality of remotely located terminals; and
    the lobes being controllable by the system so that one of the pair may be faded out while the other of the pair is increased in strength, so that an existing first communication link with a first one of the remote terminals may be interrupted while a second communication link with a second one of the remote terminals is established.

2. The system of claim 1, the single beam comprising a transmit beam.

3. The system of claim 1, the single beam comprising a receive beam.

4. The system of claim 1, the antenna system comprising an antenna aperture having a plurality of independent antenna elements; and
   a beam former in communication with the antenna aperture for controlling signals transmitted by each said antenna element to form said pair of independently steerable lobes from said single transmit beam.

5. The system of claim 1, said antenna system comprising:
   an antenna aperture having a plurality of independent antenna elements; and
   a beam former in communication with said antenna aperture for controlling each said antenna element to form said pair of independently steerable lobes from said receive beam.

6. The system of claim 1, said antenna system comprising:
   an antenna aperture; and
   a beam former that controls said antenna system to form said independently steerable lobes.

7. The system of claim 1, said antenna system comprising a phased array antenna aperture.

8. The system of claim 1, said antenna system comprising a hybrid antenna aperture including a parabolic reflector, a parabolic subreflector, and a feed array having a plurality of independent array elements.

9. A point-to-multipoint electromagnetic wave communications system, comprising:
   an antenna aperture having a plurality of independent antenna elements;
   a beam former for controlling said elements to form a single beam having a plurality of independently steerable lobes to communicate with a plurality of independent, remotely located terminals; and
   one of the lobes further being controlled so as to be faded out to interrupt an existing communication link with a first one of the remotely located terminals, while a second one of the lobes is increased in strength to establish a new communications link with a second one of the remotely located terminals.

10. The system of claim 9, said antenna aperture comprising a transmit aperture to radiate electromagnetic wave signals via said independently steerable lobes of said single beam.

11. The system of claim 9, said antenna aperture comprising a receive aperture to receive electromagnetic wave signals via said independently steerable lobes of said single beam.

12. The system of claim 9, said antenna aperture comprising a phased array antenna aperture.

13. The system of claim 9, said antenna aperture comprising:
   a parabolic reflector;
   a parabolic subreflector; and
   a feed structure including said plurality of independent elements.

14. The system of claim 9, said beam former including:
   a plurality of phase shifters, one being associated with each said antenna element; and
   a plurality of attenuators, one being associated with each said antenna element.

15. The system of claim 14, said beam former including components to control a signal gain associated with each of said independently steerable lobes so that different signal gains are provided for each of said steerable lobes.

16. A method for point-to-multipoint communications comprising:
   generating a single beam having at least a pair of distinct, independently steerable lobes;
   using an antenna to at least one of radiate and receive electromagnetic wave signals via said independently steerable lobes; and
   using the independently steerable lobes to fade out an existing communication link provided by a first one of the steerable lobes with a first remotely located terminal, while increasing the strength of a second one of the lobes to establish a new communication link with a second remotely located terminal remote from the first remotely located terminal.

17. The method of claim 16, further comprising independently controlling a signal gain associated with each of said lobes to enable communication via said independently steerable lobes with different, remotely located communication terminals at different data rates.

18. The method of claim 16, further comprising generating said beam from a ground-based location.

19. The method of claim 16, further comprising generating said beam from an airborne mobile platform.

20. The method of claim 16, further comprising generating said beam from a marine vessel.

* * * * *

UNITED STATES PATENT AND TRADEMARK OFFICE
CERTIFICATE OF CORRECTION

| | |
|---|---|
| PATENT NO. | : 7,636,552 B2 |
| APPLICATION NO. | : 11/314641 |
| DATED | : December 22, 2009 |
| INVENTOR(S) | : Anthony D. Monk |

It is certified that error appears in the above-identified patent and that said Letters Patent is hereby corrected as shown below:

On The Title Page:

Item (63), Related U.S. Application Data "Continuation-in-part of application No. 11/184,712, filed on Jul. 19, 2005, now abandoned" should be -- "Continuation-in-part of Application No. 11/184,712, filed on July 19, 2005, now abandoned, which claims benefit of Application No. 60/669,950, filed on April 8, 2005."

Signed and Sealed this
Fifth Day of April, 2011

David J. Kappos
*Director of the United States Patent and Trademark Office*